(12) United States Patent
Pratt, Jr. et al.

(10) Patent No.: US 8,325,627 B2
(45) Date of Patent: Dec. 4, 2012

(54) ADAPTIVE SCHEDULING IN A WIRELESS NETWORK

(75) Inventors: Wallace A. Pratt, Jr., Pflugerville, TX (US); Mark J. Nixon, Round Rock, TX (US); Eric D. Rotvold, West St. Paul, MN (US); Robin S. Pramanik, Karlsruhe (DE); Tomas P. Lennvall, Vasteras (SE); Terrence L. Blevins, Round Rock, TX (US)

(73) Assignee: Hart Communication Foundation, Austin, TX (US)

( * ) Notice: Subject to any disclaimer, the term of this patent is extended or adjusted under 35 U.S.C. 154(b) by 931 days.

(21) Appl. No.: 12/100,995

(22) Filed: Apr. 10, 2008

(65) Prior Publication Data
US 2008/0279155 A1 Nov. 13, 2008

Related U.S. Application Data

(60) Provisional application No. 60/911,795, filed on Apr. 13, 2007.

(51) Int. Cl.
*H04L 12/28* (2006.01)
(52) U.S. Cl. ........................................ 370/255; 370/443
(58) Field of Classification Search .................. 370/255, 370/443
See application file for complete search history.

(56) References Cited

U.S. PATENT DOCUMENTS

| | | | |
|---|---|---|---|
| 4,792,944 A | 12/1988 | Takahashi et al. | |
| 5,159,592 A | 10/1992 | Perkins | |
| 5,719,859 A | 2/1998 | Kobayashi et al. | |
| 5,926,531 A | 7/1999 | Petite | |
| 6,028,522 A | 2/2000 | Petite | |
| 6,198,751 B1 | 3/2001 | Dorsey et al. | |
| 6,218,953 B1 | 4/2001 | Petite | |
| 6,233,327 B1 | 5/2001 | Petite | |
| 6,236,334 B1 | 5/2001 | Tapperson et al. | |
| 6,298,377 B1 | 10/2001 | Hartikainen et al. | |
| 6,430,268 B1 | 8/2002 | Petite | |
| 6,437,692 B1 | 8/2002 | Petite et al. | |

(Continued)

FOREIGN PATENT DOCUMENTS

CA 2324563 A1 9/1999

(Continued)

OTHER PUBLICATIONS

International Preliminary Report on Patentability from corresponding International Application No. PCT/US08/04677 (Oct. 13, 2009).

(Continued)

*Primary Examiner* — Mark Rinehart
*Assistant Examiner* — Matthew Hopkins
(74) *Attorney, Agent, or Firm* — Marshall, Gerstein & Borun LLP

(57) ABSTRACT

A method of adaptively scheduling communications in a wireless mesh network including a plurality of network nodes includes generating a network routing scheme based on a topology of the wireless mesh network, generating a communication schedule for the wireless mesh network, and automatically updating the communication schedule in response to detecting a change in a transmission requirement of at least one of the plurality of network nodes. The act of generating a communication schedule includes defining a communication timeslot of a predefined duration and defining a plurality of superframes as repeating cycles of a certain number of consecutively scheduled communication timeslots.

24 Claims, 17 Drawing Sheets

U.S. PATENT DOCUMENTS

| | | |
|---|---|---|
| 6,522,974 B2 | 2/2003 | Sitton |
| 6,578,047 B1 | 6/2003 | Deguchi |
| 6,594,530 B1 | 7/2003 | Glanzer et al. |
| 6,618,578 B1 | 9/2003 | Petite |
| 6,628,764 B1 | 9/2003 | Petite |
| 6,747,557 B1 | 6/2004 | Petite et al. |
| 6,801,777 B2 | 10/2004 | Rusch |
| 6,836,737 B2 | 12/2004 | Petite et al. |
| 6,891,838 B1 | 5/2005 | Petite et al. |
| 6,914,533 B2 | 7/2005 | Petite |
| 6,914,893 B2 | 7/2005 | Petite |
| 6,920,171 B2 | 7/2005 | Souissi et al. |
| 6,959,356 B2 | 10/2005 | Packwood et al. |
| 6,970,909 B2 | 11/2005 | Schulzrinne |
| 6,996,100 B1 | 2/2006 | Haartsen |
| 7,002,958 B1 | 2/2006 | Basturk et al. |
| 7,053,767 B2 | 5/2006 | Petite et al. |
| 7,079,810 B2 | 7/2006 | Petite et al. |
| 7,103,511 B2 | 9/2006 | Petite |
| 7,110,380 B2 | 9/2006 | Shvodian |
| 7,137,550 B1 | 11/2006 | Petite |
| 7,209,840 B2 | 4/2007 | Petite et al. |
| 7,263,073 B2 | 8/2007 | Petite et al. |
| 7,292,246 B2 | 11/2007 | Goldschmidt |
| 7,295,128 B2 | 11/2007 | Petite |
| 7,346,463 B2 | 3/2008 | Petite et al. |
| 7,375,594 B1 | 5/2008 | Lemkin et al. |
| 7,397,907 B2 | 7/2008 | Petite |
| 7,420,980 B1 * | 9/2008 | Pister et al. ............... 370/401 |
| 7,468,661 B2 | 12/2008 | Petite et al. |
| 7,529,217 B2 | 5/2009 | Pister et al. |
| 7,602,741 B2 | 10/2009 | Tapperson et al. |
| 7,650,425 B2 | 1/2010 | Davis et al. |
| 7,675,935 B2 | 3/2010 | Samudrala et al. |
| 7,680,033 B1 | 3/2010 | Khan et al. |
| 7,697,492 B2 | 4/2010 | Petite |
| 7,848,827 B2 | 12/2010 | Chen |
| 7,853,221 B2 | 12/2010 | Rodriguez et al. |
| 7,978,059 B2 | 7/2011 | Petite et al. |
| 8,013,732 B2 | 9/2011 | Petite et al. |
| 8,064,412 B2 | 11/2011 | Petite |
| 2001/0030957 A1 | 10/2001 | McCann et al. |
| 2001/0041591 A1 | 11/2001 | Carroll |
| 2002/0007414 A1 | 1/2002 | Inoue et al. |
| 2002/0013679 A1 | 1/2002 | Petite |
| 2002/0031101 A1 | 3/2002 | Petite et al. |
| 2002/0067693 A1 | 6/2002 | Kodialam et al. |
| 2002/0111169 A1 | 8/2002 | Vanghi |
| 2002/0120671 A1 | 8/2002 | Daffner et al. |
| 2003/0014535 A1 | 1/2003 | Mora |
| 2003/0026268 A1 | 2/2003 | Navas |
| 2003/0040897 A1 | 2/2003 | Murphy et al. |
| 2003/0074489 A1 | 4/2003 | Steger et al. |
| 2003/0169722 A1 | 9/2003 | Petrus et al. |
| 2003/0198220 A1 | 10/2003 | Gross et al. |
| 2003/0236579 A1 | 12/2003 | Hauhia et al. |
| 2004/0028023 A1 | 2/2004 | Mandhyan et al. |
| 2004/0053600 A1 | 3/2004 | Chow et al. |
| 2004/0095951 A1 | 5/2004 | Park |
| 2004/0117497 A1 | 6/2004 | Park |
| 2004/0148135 A1 | 7/2004 | Balakrishnan et al. |
| 2004/0174904 A1 | 9/2004 | Kim et al. |
| 2004/0183687 A1 | 9/2004 | Petite et al. |
| 2004/0203973 A1 | 10/2004 | Khan |
| 2004/0257995 A1 | 12/2004 | Sandy et al. |
| 2004/0259533 A1 * | 12/2004 | Nixon et al. ............... 455/414.1 |
| 2005/0013253 A1 | 1/2005 | Lindskog et al. |
| 2005/0018643 A1 | 1/2005 | Neilson et al. |
| 2005/0025129 A1 | 2/2005 | Meier |
| 2005/0030968 A1 | 2/2005 | Rich et al. |
| 2005/0049727 A1 | 3/2005 | Tapperson et al. |
| 2005/0078672 A1 | 4/2005 | Caliskan et al. |
| 2005/0085928 A1 | 4/2005 | Shani |
| 2005/0114517 A1 | 5/2005 | Maffeis |
| 2005/0125085 A1 | 6/2005 | Prasad et al. |
| 2005/0160138 A1 | 7/2005 | Ishidoshiro |
| 2005/0164684 A1 | 7/2005 | Chen et al. |
| 2005/0190712 A1 | 9/2005 | Lee et al. |
| 2005/0192037 A1 | 9/2005 | Nanda et al. |
| 2005/0213612 A1 | 9/2005 | Pister et al. |
| 2005/0228509 A1 | 10/2005 | James |
| 2005/0239413 A1 | 10/2005 | Wiberg et al. |
| 2005/0249137 A1 | 11/2005 | Todd et al. |
| 2005/0276233 A1 | 12/2005 | Shepard et al. |
| 2005/0282494 A1 | 12/2005 | Kossi et al. |
| 2006/0007927 A1 | 1/2006 | Lee et al. |
| 2006/0029060 A1 | 2/2006 | Pister |
| 2006/0029061 A1 | 2/2006 | Pister et al. |
| 2006/0045016 A1 | 3/2006 | Dawdy et al. |
| 2006/0062192 A1 | 3/2006 | Payne |
| 2006/0067280 A1 | 3/2006 | Howard et al. |
| 2006/0077917 A1 | 4/2006 | Brahmajosyula et al. |
| 2006/0120384 A1 | 6/2006 | Boutboul et al. |
| 2006/0174017 A1 | 8/2006 | Robertson |
| 2006/0182076 A1 | 8/2006 | Wang |
| 2006/0213612 A1 | 9/2006 | Perron et al. |
| 2006/0215582 A1 | 9/2006 | Castagnoli et al. |
| 2006/0245440 A1 | 11/2006 | Mizukoshi |
| 2006/0253584 A1 | 11/2006 | Dixon et al. |
| 2007/0016724 A1 | 1/2007 | Gaither et al. |
| 2007/0070943 A1 | 3/2007 | Livet et al. |
| 2007/0074489 A1 | 4/2007 | Erhardt et al. |
| 2007/0076600 A1 | 4/2007 | Ekl et al. |
| 2007/0078995 A1 | 4/2007 | Benard et al. |
| 2007/0109592 A1 | 5/2007 | Parvathaneni et al. |
| 2007/0118604 A1 | 5/2007 | Costa Requena |
| 2007/0121531 A1 | 5/2007 | Lee et al. |
| 2007/0140245 A1 | 6/2007 | Anjum et al. |
| 2007/0143392 A1 | 6/2007 | Choe et al. |
| 2007/0161371 A1 | 7/2007 | Dobrowski et al. |
| 2007/0237094 A1 | 10/2007 | Bi et al. |
| 2007/0243879 A1 | 10/2007 | Park et al. |
| 2007/0280144 A1 | 12/2007 | Hodson et al. |
| 2007/0280286 A1 | 12/2007 | Hodson et al. |
| 2007/0282463 A1 | 12/2007 | Hodson et al. |
| 2007/0283030 A1 | 12/2007 | Deininger et al. |
| 2008/0075007 A1 | 3/2008 | Mehta et al. |
| 2008/0082636 A1 | 4/2008 | Hofmann et al. |
| 2008/0084852 A1 | 4/2008 | Karschnia |
| 2008/0098226 A1 | 4/2008 | Zokumasui |
| 2008/0117836 A1 | 5/2008 | Savoor et al. |
| 2008/0120676 A1 | 5/2008 | Morad et al. |
| 2008/0148296 A1 | 6/2008 | Chen et al. |
| 2008/0192812 A1 | 8/2008 | Naeve et al. |
| 2008/0198860 A1 | 8/2008 | Jain et al. |
| 2008/0215773 A1 | 9/2008 | Christison et al. |
| 2008/0285582 A1 | 11/2008 | Pister et al. |
| 2009/0059855 A1 * | 3/2009 | Nanda et al. ............... 370/329 |
| 2009/0068947 A1 | 3/2009 | Petite |
| 2009/0097502 A1 | 4/2009 | Yamamoto |
| 2009/0154481 A1 | 6/2009 | Han et al. |
| 2010/0194582 A1 | 8/2010 | Petite |
| 2010/0312881 A1 | 12/2010 | Davis et al. |
| 2011/0264324 A1 | 10/2011 | Petite et al. |
| 2011/0309953 A1 | 12/2011 | Petite et al. |
| 2011/0320050 A1 | 12/2011 | Petite et al. |

FOREIGN PATENT DOCUMENTS

| | | |
|---|---|---|
| CN | 1170464 A | 1/1998 |
| CN | 1804744 A | 7/2006 |
| EP | 1169690 A2 | 1/2002 |
| EP | 1236075 A2 | 9/2002 |
| EP | 1370958 A1 | 12/2003 |
| EP | 1376939 A2 | 1/2004 |
| EP | 2388708 A1 | 11/2011 |
| GB | 2 403 043 A | 12/2004 |
| JP | 2005143001 A | 6/2005 |
| KR | 1020010076781 | 8/2001 |
| KR | 1020040048245 | 6/2004 |
| KR | 1020050028737 | 3/2005 |
| KR | 1020060066580 | 6/2006 |
| KR | 1020050066891 | 9/2006 |
| KR | 1020060111318 | 10/2006 |
| KR | 1020070026600 | 3/2007 |
| WO | WO-00/55825 A1 | 9/2000 |
| WO | WO-01/35190 A2 | 5/2001 |
| WO | WO-02/05199 A1 | 1/2002 |

| | | |
|---|---|---|
| WO | WO-02/13036 A1 | 2/2002 |
| WO | WO-02/13412 A1 | 2/2002 |
| WO | WO-02/13413 A1 | 2/2002 |
| WO | WO-02/13414 A1 | 2/2002 |
| WO | WO-02/075565 A1 | 9/2002 |
| WO | WO-2005079026 A1 | 8/2005 |
| WO | WO-2005/096722 A2 | 10/2005 |
| WO | WO-2006121114 A1 | 11/2006 |

OTHER PUBLICATIONS

International Search Report and Written Opinion for corresponding International Application No. PCT/US08/04677 (Jul. 31, 2008).

Chinese Office Action for 2012051700727190 mailed May 22, 2012.

Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.

Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.

Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.

Kastner et al., "Communication Systems for Building Automation and Control," Proceedings of the IEEE, vol. 93, No. 6, Jun. 1, 2005, pp. 1178-1203.

Thomesse, J., "Fieldbus Technology in Industrial Automation," Proceedings of the IEEE, vol. 93, No. 6, Jun. 1, 2005, pp. 1073-1101.

Cleveland, F., "IEC TC57 Security Standards for the Power System's Information Infrastructure—Beyond Simple Encryption," May 21, 2006, pp. 1079-1087.

Matkurbanov et al., "A Survey and Analysis of Wireless Fieldbus for Industrial Environments," SICE-ICCAS 2006 International Joint Conference, 5555-5561 (2006).

Lopez et al., "Wireless communications deployment in industry: a review of issues, options and technologies," Computers in Industry, Elsevier Science, 56:29-53 (2005).

Shen et al., "Wireless Sensor Networks for Industrial Applications," WCICA, 15-19 (2004).

"A Survey and Analysis of Wireless Field bus for Industrial Environments", Pulat Matkurbanov, SeungKi Lee, Dong-Sung Kim; Dept. of Electron. Eng., Kumoh Nat. Inst. of Technol., Gumi. This paper appears in: SICE-ICASE, 2006. International Joint Conference: Issue Date: Oct. 18-21, 2006, on pp. 55555-55561; Print ISBN: 89-950038-4-7.

"D1100 SmartMesh Network Release 1.0 Engineering Software Specifications," Dust Networks, Dec. 17, 2011, 36 pages.

"D1100 SmartMesh Network Release 1.0 Engineering Software Specifications," Dust Networks, 36 pages.

"Multiple Interpenetrating MultiDiGraphs," Dust Incorporated, 12 pages. (Powerpoint).

"SmartMesh-XT CLI Commands Guide," Dust Networks, Inc., Jun. 27, 2007, 36 pages.

SmartMesh-XT KT1030/KT2135/KT2030 Evaluation Kit Guide, Dust Networks, Inc., Nov. 2, 2007, 58 pages.

"SmartMesh-XT M2135-2, M2030-2 2.4 GHz Wireless Analog/ Digital/Serial Motes," Dust Networks, Inc., Mar. 28, 2007, 33 pages.

SmartMesh-XT Manager XML API Guide, Dust Networks, Inc., Apr. 4, 2007, 148 pages.

"System Description for Security Review SmartMesh Alba," Dust Networks, 36 pages.

Berlemann, Software Defined Protocols Based on Generic Protocol Functions for Wired and Wireless Networks, Nov. 2033, RWTH Aachen University.

Qu et al., "A web-enabled distributed control application platform for industrial automation", Emerging Technologies and Factory Automation, Proceedings, 2:129-32 (Sep. 16, 2003).

Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).

Zheng, "ZigBee wireless sensor network in industrial applications", SICE-ICCAS 2006 International Joint Conference, IEEE, New Jersey, pp. 1067-1070 (Oct. 1, 2006).

Deering et al., "Internet Protocol, Version 6 (IPv6) Specification; rfc1883.txt", IETF Standard, Internet Engineering Task Force, IETF, CH, Dec. 1, 1995, XP015007667.

* cited by examiner

FIG. 6

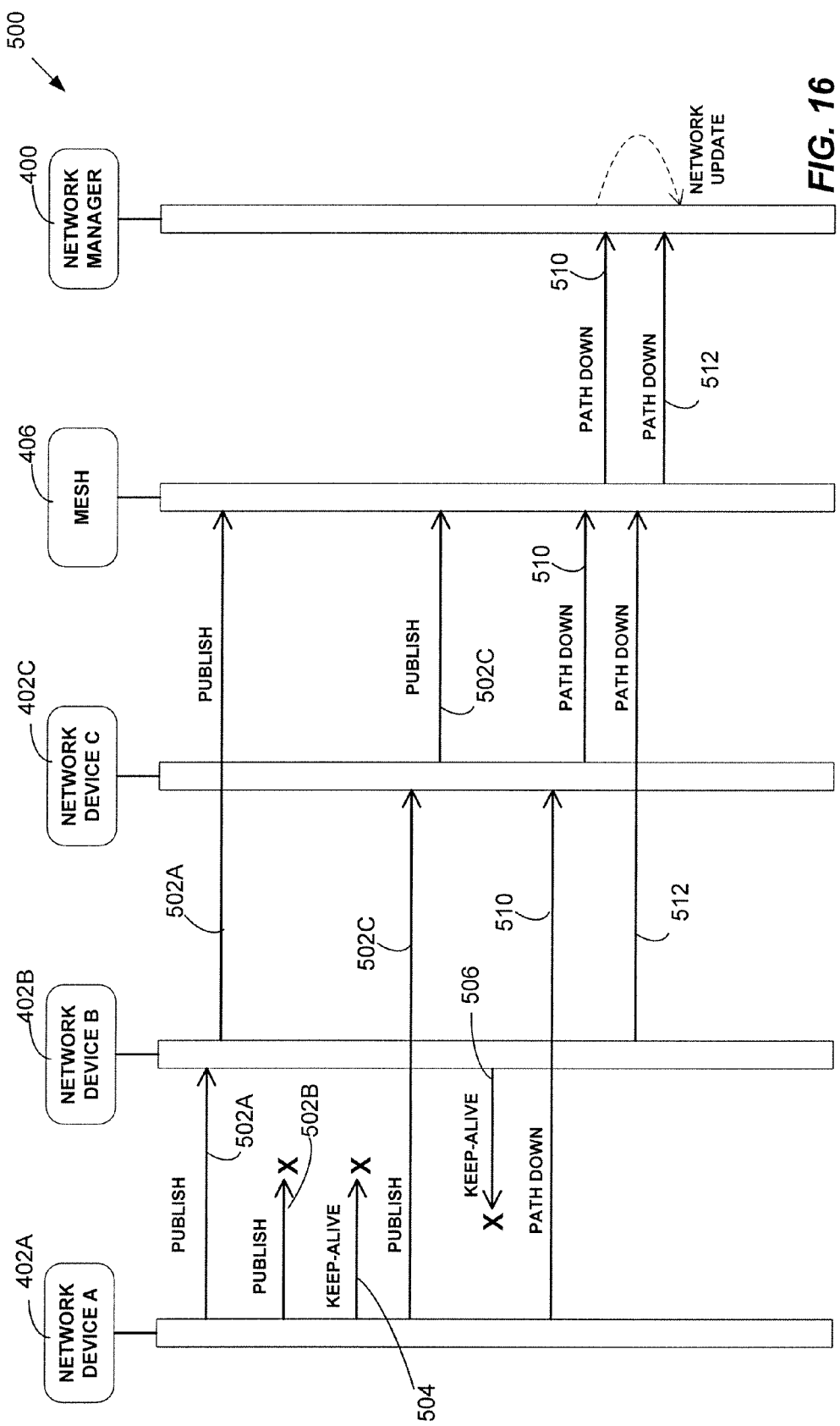

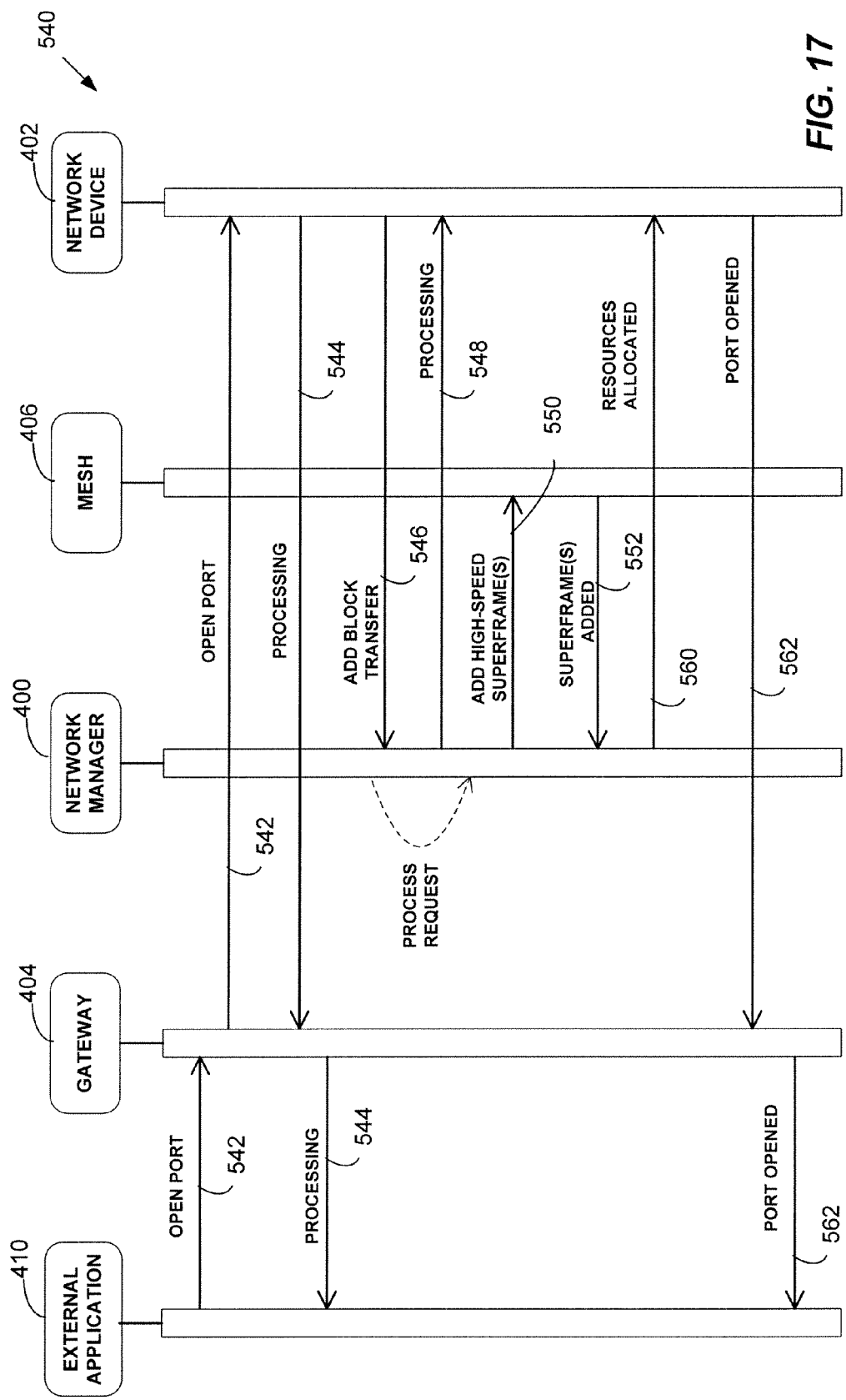

ADAPTIVE SCHEDULING IN A WIRELESS NETWORK

CROSS-REFERENCE TO RELATED APPLICATIONS

This application is based on and claims the benefit of priority to U.S. Provisional Application No. 60/911,795, entitled "Routing, Scheduling, Reliable and Secure Operations in a Wireless Communication Protocol" filed Apr. 13, 2007, the entire disclosure of which is hereby expressly incorporated herein by reference.

FIELD OF TECHNOLOGY

The present invention relates generally to wireless communications and, more particularly, to increasing reliability in a wireless network.

BACKGROUND

Communication protocols rely on various routing techniques to transfer data between communication endpoints on a communication network. Communication or network protocols and the corresponding routing strategies are typically selected in view of such factors as knowledge of network topology, size of the network, type of medium used as a signal carrier, security and reliability requirements, tolerable transmission delays, and types of devices forming the network. Due to a large number of such factors, a typical routing technique meets some of the design objectives at the expense of the others. For example, a certain routing technique may provide a high level of reliability in data delivery but may also require a relatively high overhead. Thus, while there are many known approaches to routing and many protocols compatible with these routing methods, there remain communication networks with the specific requirements that are not fully satisfied by any of the available routing methods and protocols. Moreover, as new types of communication networks, with the increasing demands for efficiency, throughput, and reliability, emerge in various industrial and commercial applications, the architects and developers frequently encounter new problems which are not easily addressed by the existing protocols and the associated routing techniques.

Generally speaking, a communication network includes nodes which are the senders and recipients of data sent over communication paths (either hardwired or wireless communication paths) connecting the nodes. Additionally, communication networks typically include dedicated routers responsible for directing traffic between nodes, and, optionally, include dedicated devices responsible for configuring and managing the network. Some or all of the nodes may be also adapted to function as routers so as to direct traffic sent between other network devices. Network devices may be inter-connected in a wired or wireless manner, and network devices may have different routing and transfer capabilities than certain nodes within the network. For example, dedicated routers may be capable of high volume transmissions while some nodes may only be capable of sending and receiving relatively little traffic over the same period of time. Additionally, the connections between nodes on a network may have different throughput capabilities and different attenuation characteristics. A fiber-optic cable, for example, may be capable of providing a bandwidth several orders of magnitude higher than a wireless link because of the difference in the inherent physical limitations of the medium.

In order for a node to send data to another node on a typical network, either the complete path from the source to the destination or the immediately relevant part of the path must be known. For example, the World Wide Web (WWW) allows pairs of computer hosts to communicate over large distances without either host knowing the complete path prior to sending the information. Instead, hosts are configured with the information about their assigned gateways and dedicated routers. In particular, the Internet Protocol (IP) provides network layer connectivity to the WWW. The IP defines a sub-protocol known as Address Resolution Protocol (ARP) which provides a local table at each host specifying the routing rules. Thus, a typical host connected to the WWW or a similar Wide Area Network (WAN) may know to route all packets with the predefined addresses matching a pre-configured pattern to host A and route the rest of the packets to host B. Similarly, the intermediate hosts forwarding the packets, or "hops," also execute partial routing decisions and typically direct data in the general direction of the destination.

In most network protocols, most or all network devices are assigned sufficiently unique addresses to enable hosts to exchange information in an unambiguous manner. At least in case of unicast (one-to-one) transmissions, the destination address must be specified at the source. For this reason, network protocols typically define a rigid addressing scheme. As one of ordinary skill in the art will recognize, modifying or expanding addressing schemes is a complicated and expensive process. For example, the transition from version 4 of the IP protocol (IPv4) to version 6 (IPv6) requires significant updates to much of the infrastructure supporting IPv4. On the other hand, defining addressing schemes with large capability for small networks creates an unnecessary overhead. Thus, a network protocol ideally suited for a particular application offers a sufficient number of possible addresses without an excessive overhead in data transmission.

In short, there is a number of factors influencing the implementation of particular protocols in particular industries. In the process control industry, it is known to use standardized communication protocols to enable devices made by different manufacturers to communicate with one another in an easy to use and implement manner. One such well known communication standard used in the process control industry is the Highway Addressable Remote Transmitter (HART) Communication Foundation protocol, referred to generally as the HART® protocol. Generally speaking, the HART® protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

There has been a move, in the past number of years, to incorporate wireless technology into various industries including, in some limited manners, the process control industry. However, there are significant hurdles in the process control industry that limit the full scale incorporation, acceptance and use of wireless technology. In particular, the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236, 334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

Similar to wired communications, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. Moreover, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In the process control industry, developers of wireless communication protocols face additional challenges, such as achieving backward compatibility with wired devices, supporting previous wired versions of a protocol, providing transition services to devices retrofitted with wireless communicators, and providing routing techniques which can ensure both reliability and efficiency. Meanwhile, there remains a wide number of process control applications in which there are few, if any, in-place measurements. Currently these applications rely on observed measurements (e.g. water level is rising) or inspection (e.g. period maintenance of air conditioning unit, pump, fan, etc) to discover abnormal situations. In order to take action, operators frequently require face-to-face discussions. Many of these applications could be greatly simplified if measurement and control devices were utilized; however, current measurement devices usually require power, communications infrastructure, configuration, and support infrastructure which simply is not available.

In another aspect, the process control industry requires that the communication protocol servicing a particular process control network be able to accommodate field devices with different data transmission requirements, priorities, and power capabilities. In particular, some process control systems may include measurement devices that frequently (such as several times per second) report measurements to a centralized controller or to another field device. Meanwhile, another device in the same system may report measurements, alarms, or other data only once per hour. However, both devices may require that the respective measurement reports propagate to a destination host, such as a controller, a workstation, or a peer field device, with as little overhead in time and bandwidth as possible.

In yet another aspect, wires communications in general are highly sensitive to interferences from such sources as wireless transmitters, atmospheric conditions, or obstacles blocking or reflecting electromagnetic waves. Moreover, some of these conditions may rapidly change. Unlike conventional communication networks which rely on the typically stable wire connections, wireless networks may quickly acquire or, conversely, lose the existing wireless connections. Further, a wireless connection between a pair of wireless devices may have a different throughput capability and a different quality of service at different times during the operation of the corresponding wireless network.

SUMMARY

In one embodiment, a mesh communication network for use in, for example, process control plants includes a plurality of network devices transmitting and receiving data according to a network schedule which the communication network adjusts during operation and in view of several factors indicative of the performance of the wireless network. In some embodiments, the network schedule includes several concurrent overlapping superframes, each having a finite number of timeslots of predefined duration. In response to detecting changes in transmission requirements at one or more network devices, the communication network may define one or more additional superframes, destroy one or more existing superframes, or temporarily deactivate one or more superframes. In at least some of the embodiments, a network manager residing in or outside the communication network collects statistics and various metrics from at least some of the network devices and adjusts the communication schedule based on the collected data.

In an embodiment, the network manager may be implemented as a software module running on a host residing in or outside of the network. In another embodiment, the network manager may be a dedicated physical device communicatively coupled to the network. In yet another embodiment, the network manager may be distributed among several devices residing in or outside of the network.

In some embodiments, the devices operating in the wireless network transmit and receive data along a set of graphs defining communication paths between pairs of network devices, and the network manager develops an efficient routing scheme by analyzing the topology of the network and defining a set of graphs for use in routing or transmitting data between various nodes of the network. During operation of the wireless network, the network manager may adjust one or more graphs in view of the changing environmental conditions and/or new transmission requirements. In some embodiments, the network manager may define new direct wireless connections between pairs of network devices or, conversely, deactivate some of the existing direct wireless connections. In other embodiments, the network manager may additionally modify some of the communication paths based on the unchanged plurality of direct wireless connections.

In some embodiments, at least some of the network devices are field devices performing a measurement or control functions in a process control environment. Each of these field devices is provisioned with a particular update rate, or frequency of communicating process data to another network device. In this case, the network manager may define superframes according to the update rates of the field devices. Moreover, if desired, a field device can negotiate a temporary change in timeslot allocation due to an occurrence of a transient condition requiring a higher-than-normal or lower-than-normal bandwidth.

In another aspect, the network manager may update the communication schedule of the wireless network in view of such factors as transmit/receive rates at each network device, delivery failure rate at each link, and other performance metrics of the wireless network. In another aspect, the network manager may modify the routing strategy (e.g., define new graphs, define new wireless links, etc) in view of such factors as delivery delays associated with one or more routing graphs, delivery failure rates at one or more network devices, and other information indicative of the ability of the wireless network to efficiently and reliably propagate data. In some embodiments, the network manager may adjust both routing and scheduling decisions based on statistical data and/or on signal strength measurements and other metrics.

In another aspect, each network device may periodically transmit a health report to the network manager including measurements of signals emitted by the neighbors of the network device. In response to receiving a health report from a certain network device, the network manager may adjust routing (e.g., one or more graphs, create or destroy direct wireless connections, etc.), scheduling, or both. In another aspect, a network device may report the discovery of a new wireless device which may potentially join the wireless network or, in some cases, the discovery of a new wireless connection to a wireless network already participating in the network. The network manager may similarly re-adjust the existing routing scheme and/or the communication schedule in view of the newly reported conditions. In this sense, the wireless network may be considered a self-adjusting and self-healing.

In yet another aspect, a wired device or a wireless device may join an operational wireless network without restarting or manually reconfiguring the network. In its initial configuration, a wireless network may include a gateway and a network manager running on the same host as the gateway or elsewhere within the plant automation network. Wireless devices and wired devices equipped with wireless adapters may join the network by processing advertisement messages and exchanging one or more messages with the network manager as part of a join sequence. In this sense, an operator may gradually build up a wireless network as a new installation as an upgrade of an existing wired network.

In some embodiments, the network manager may collect statistics indicating the rates of successfully delivering packets for some or all pairs of network devices. Additionally or alternatively, each network device may collect transmit/receive statistics and the network manager may further attempt to adjust a respective portion of the network routing scheme and/or schedule in response to detecting an improper distribution of resources. In some of these embodiments, the network device may maintain separate counts of packets transmitted and received at the corresponding network node, report the count to the network manager (periodically, in response to a request from the network manager, etc.), and the network manager may then determine which wireless connections are excessively or insufficiently loaded. In this embodiment, the network manager may attempt to balance the workload of various network devices. In some of these embodiments, the statistics are related to the network layer of the OSI-7 protocol stack.

In some embodiments, the network manager may quickly deactivate one or more superframes in response to detecting a certain change in the wireless network such as a temporary suspension of a network device, for example. The network manager may then reactivate the one or more deactivated superframes by issuing an appropriate command.

In some embodiments, the wireless network may support both periodic ("burst mode") and unscheduled ("request/response") communications between pairs of network devices. In one such embodiment, the periodic traffic may include the process data which a particular network device publishes at regular intervals within superframes defined according to the transmission rate of the network device. Meanwhile, the request/response communications may include commands issued from an external host (i.e., a host operating outside the wireless network to a network device and the corresponding responses. In some embodiments, a network device may occasionally wish to report a certain amount of data in addition or instead of the regularly published process data as part of a so-called "block mode" transfer and, to obtain sufficient resources for the transfer, may request the bandwidth from the network manager. Additionally, the wireless network in some embodiments may support management traffic, event and alarm traffic, and other types of data services.

DETAILED DESCRIPTION OF THE DRAWINGS

FIG. 1 schematically illustrates a wireless network, connected to a plant automation network via a gateway device, providing communication between field devices and router devices and utilizing the routing techniques of the present disclosure.

Figure 5:
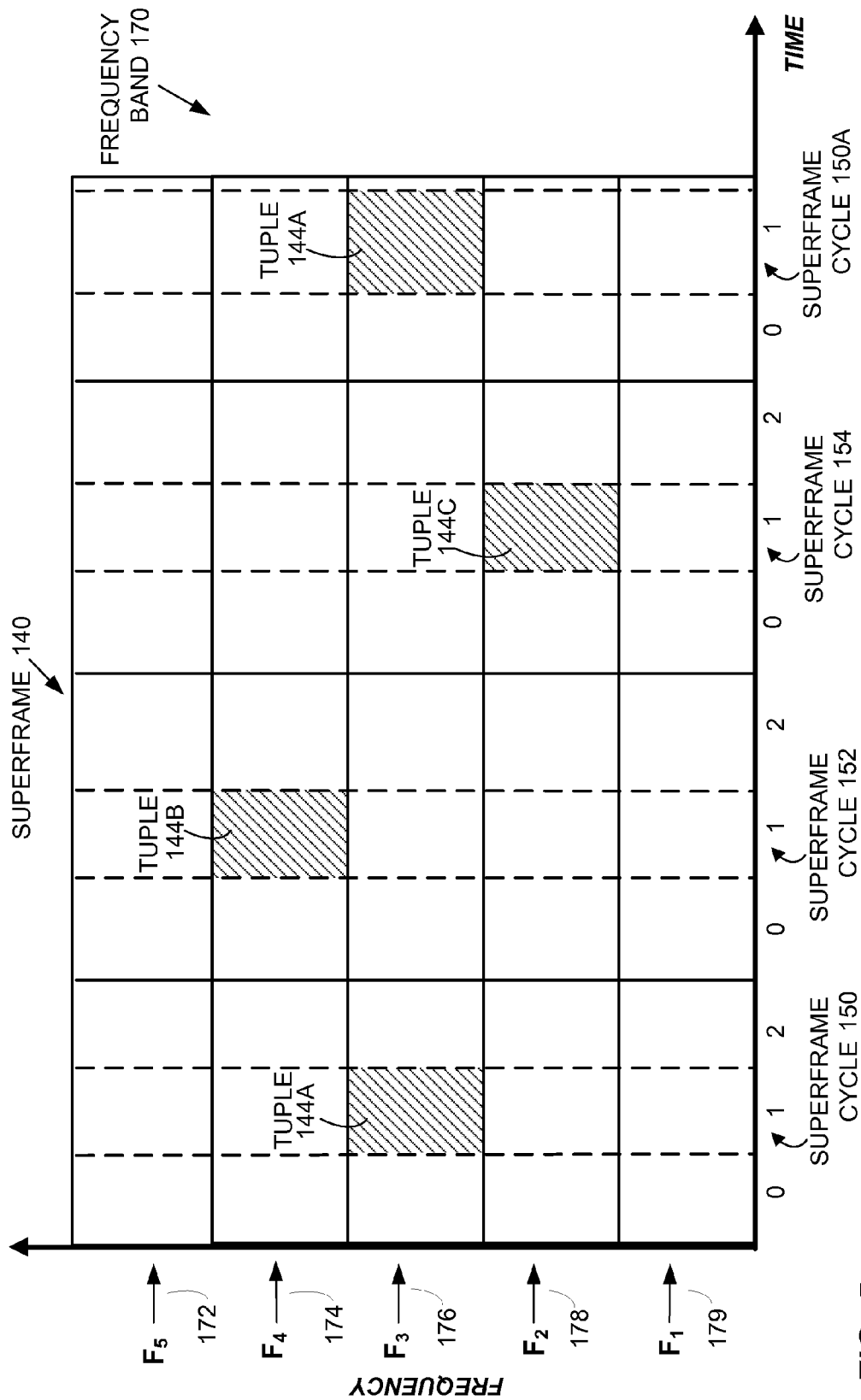

FIG. 5 schematically illustrates association of a timeslot of an exemplary superframe with several communication channels.

Figure 6:
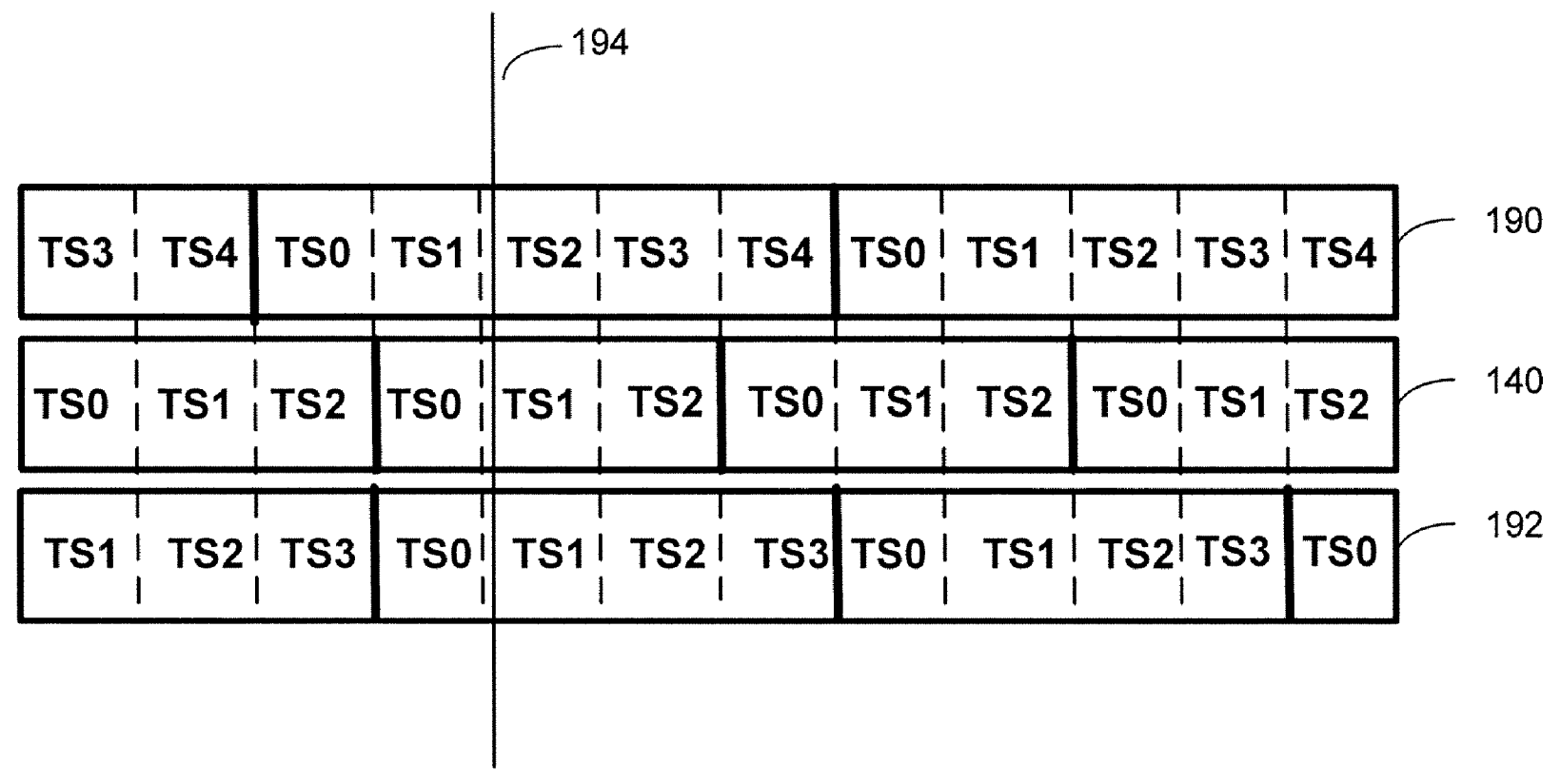

FIG. 6 is a block diagram that schematically illustrates an exemplary superframe definition including several concurrent superframes of different length.

Figure 1:
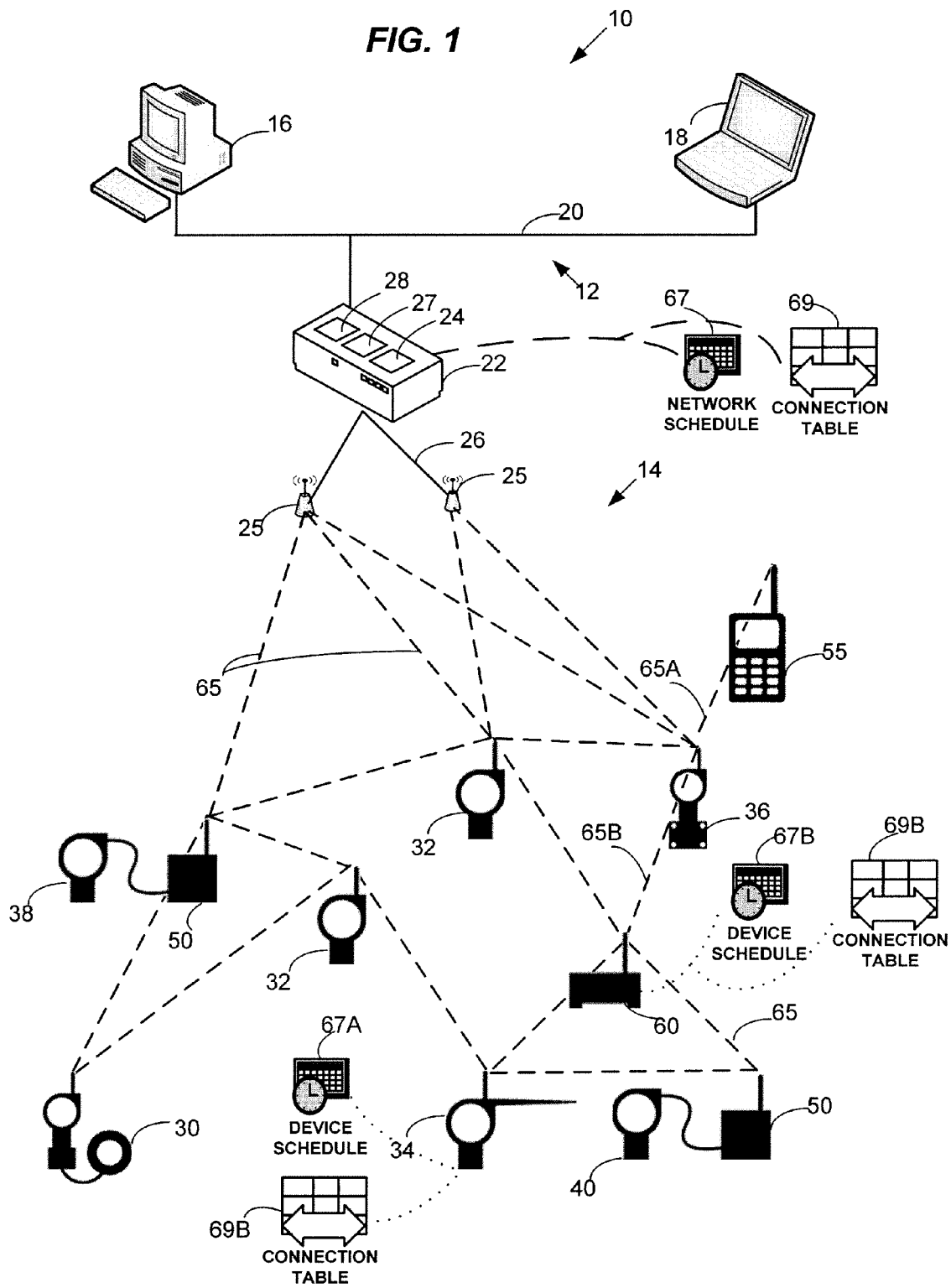
Figure 3:
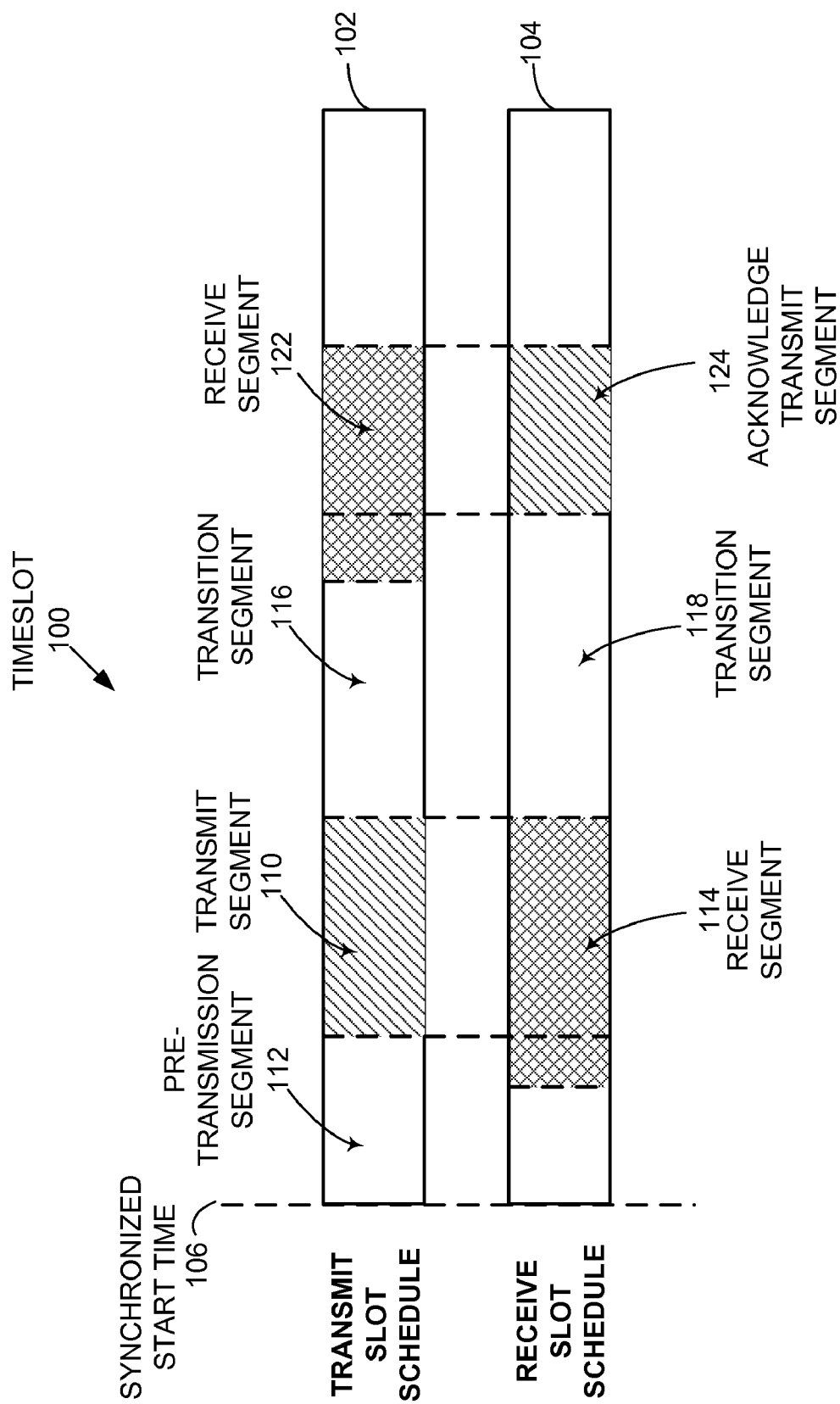
FIG. 3 is a block diagram that illustrates segments of a communication timeslot defined in accordance with one of the embodiments discussed herein.
Figure 7:
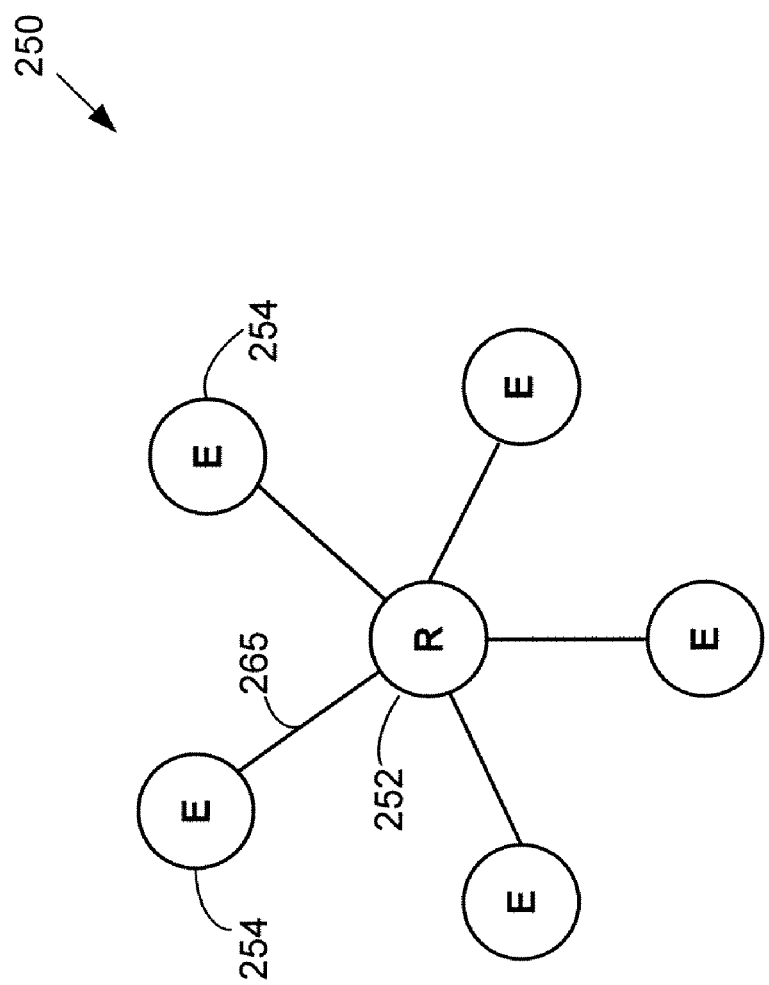

FIG. 7 schematically illustrates a star network topology to which a wireless network such as the network illustrated in FIG. 1 or FIG. 3 may conform.

Figure 8:
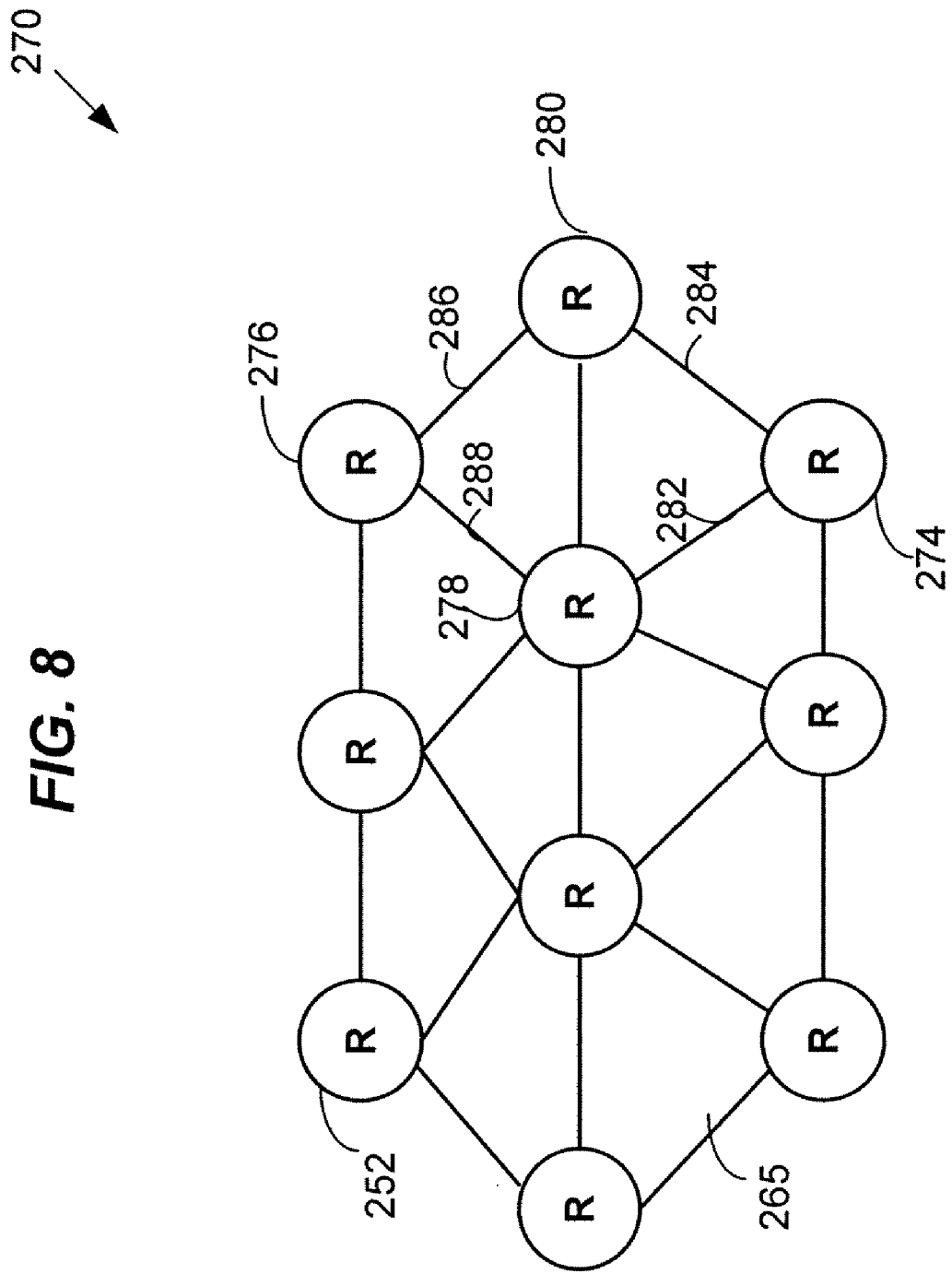

FIG. 8 schematically illustrates a mesh network topology to which a wireless network such as the network illustrated in FIG. 1 or FIG. 3 may conform.

Figure 9:
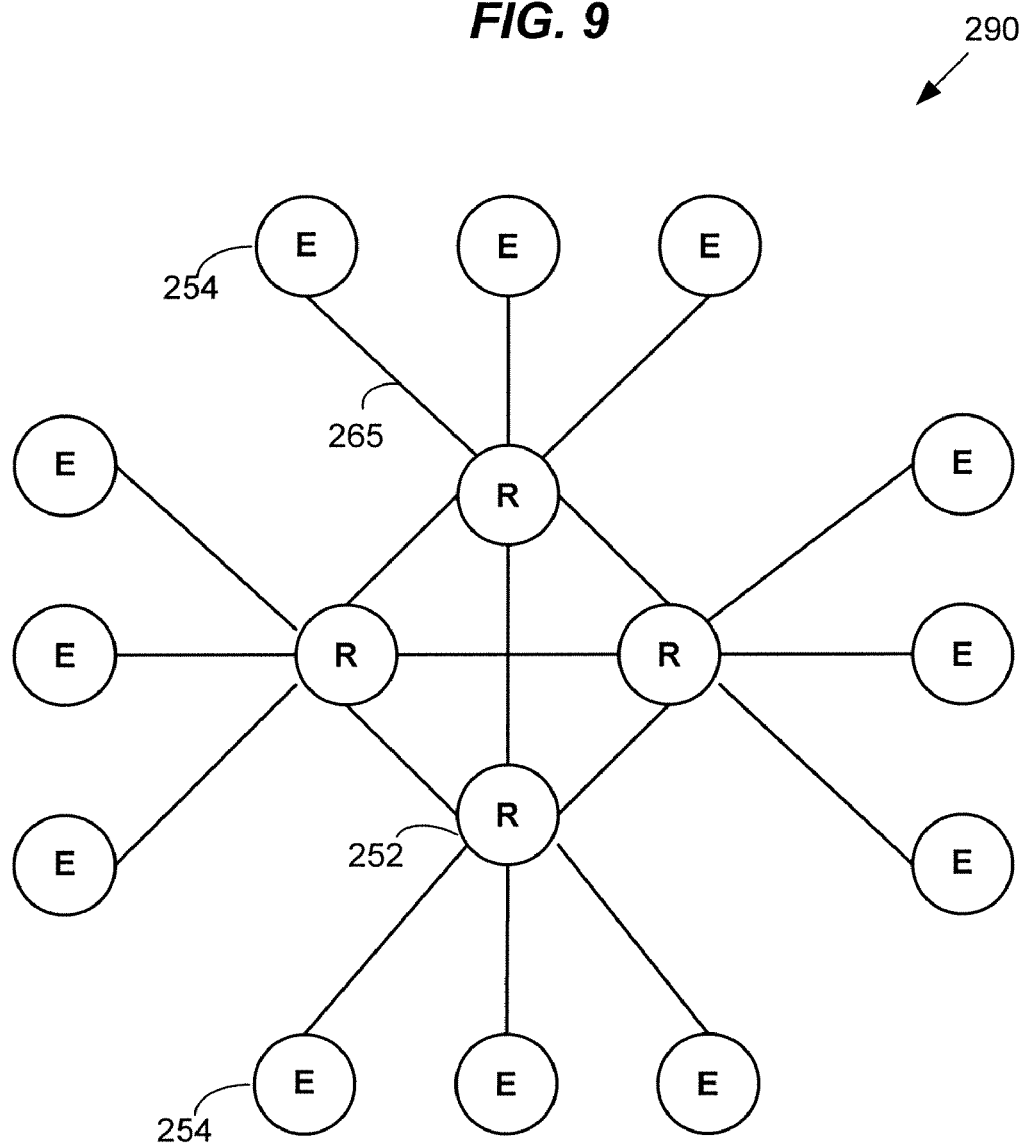

FIG. 9 schematically illustrates a star mesh network topology to which a wireless network such as the network illustrated in FIG. 1 or FIG. 3 may conform.

Figure 10:
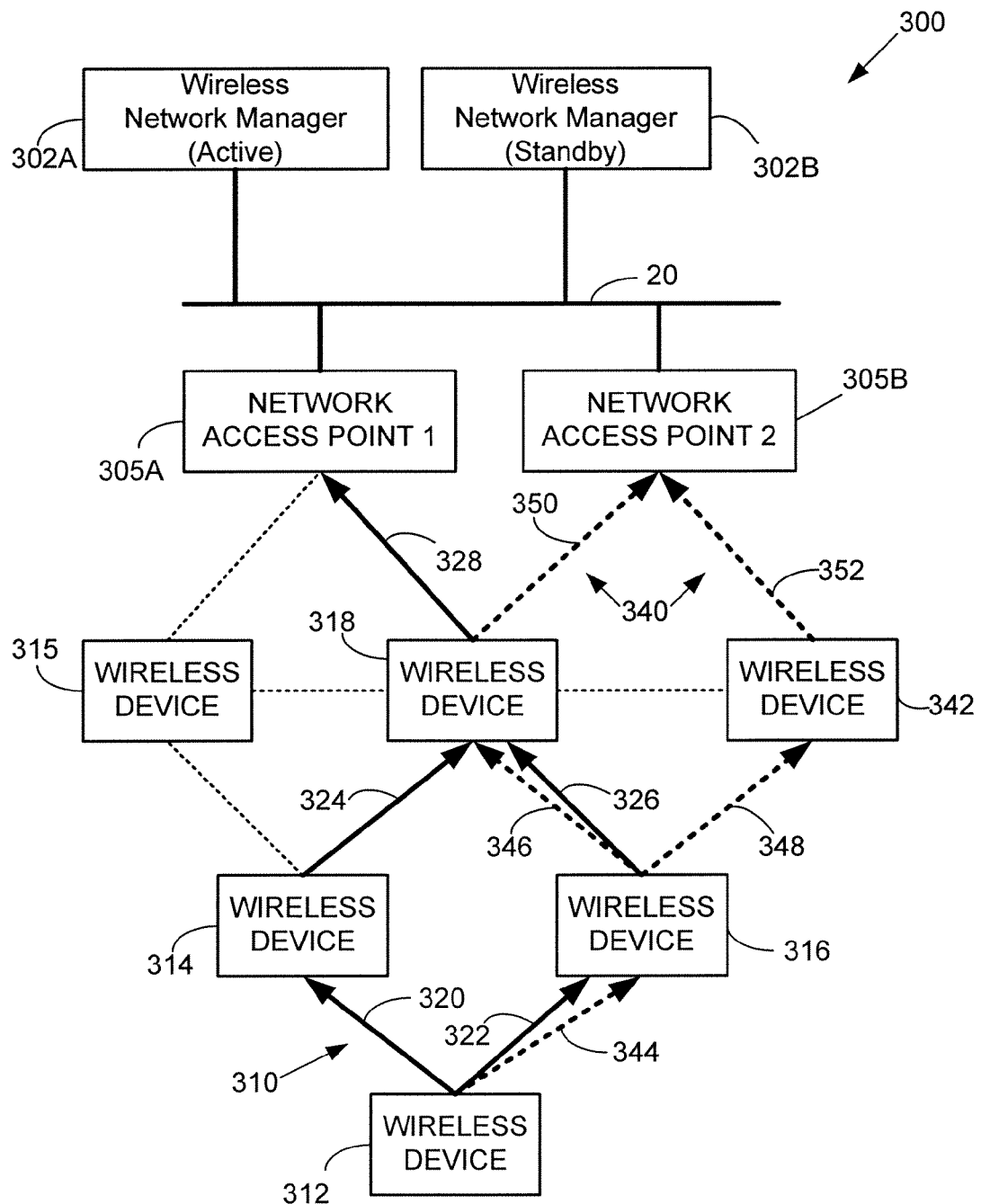

FIG. 10 is a block diagram illustrating redundant upstream data paths in a wireless network utilizing some of the graph routing techniques of the present disclosure.

Figure 11:
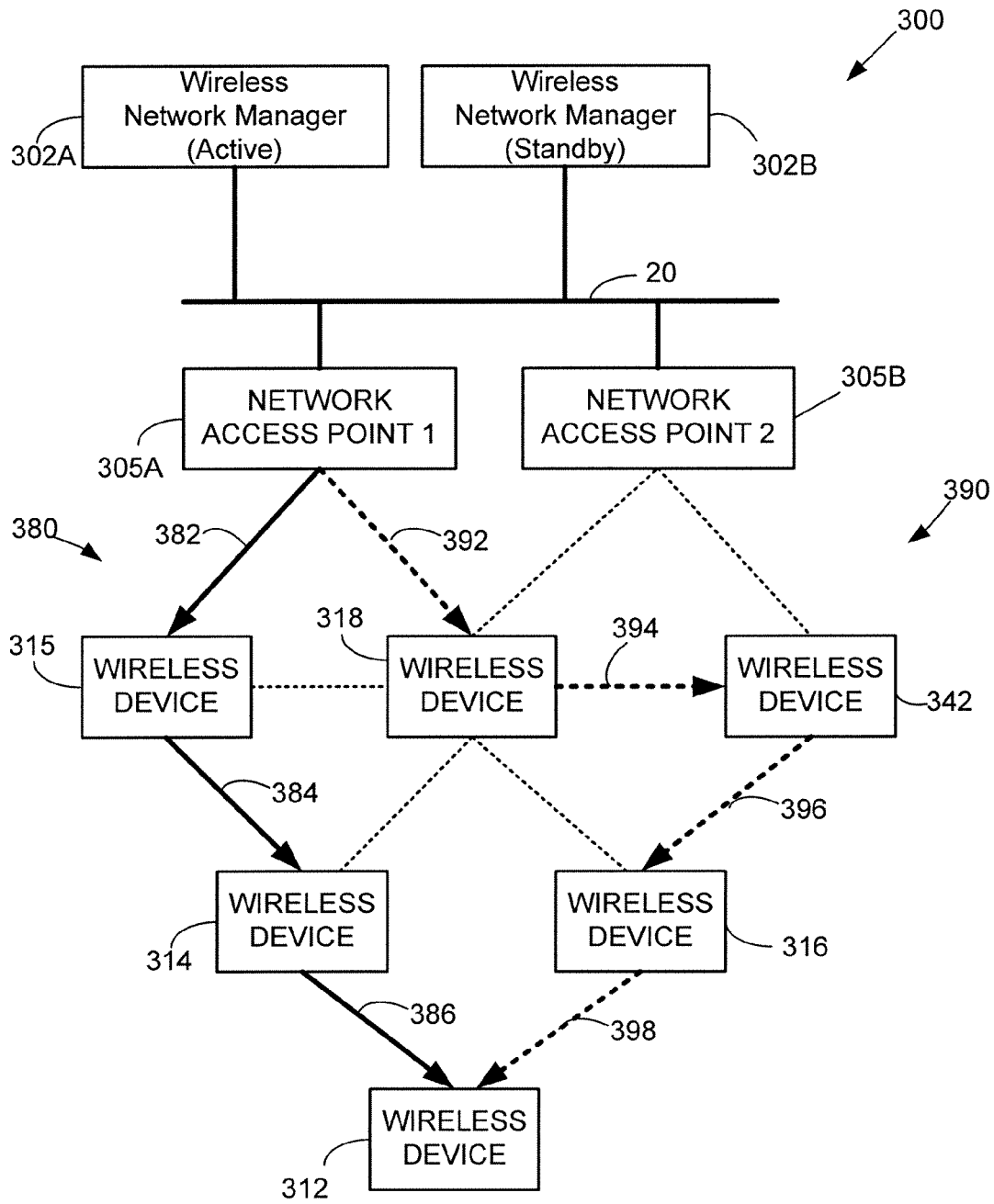

FIG. 11 is a block diagram illustrating redundant downstream data paths in a wireless network utilizing some of the graph routing techniques of the present disclosure.

Figure 12:
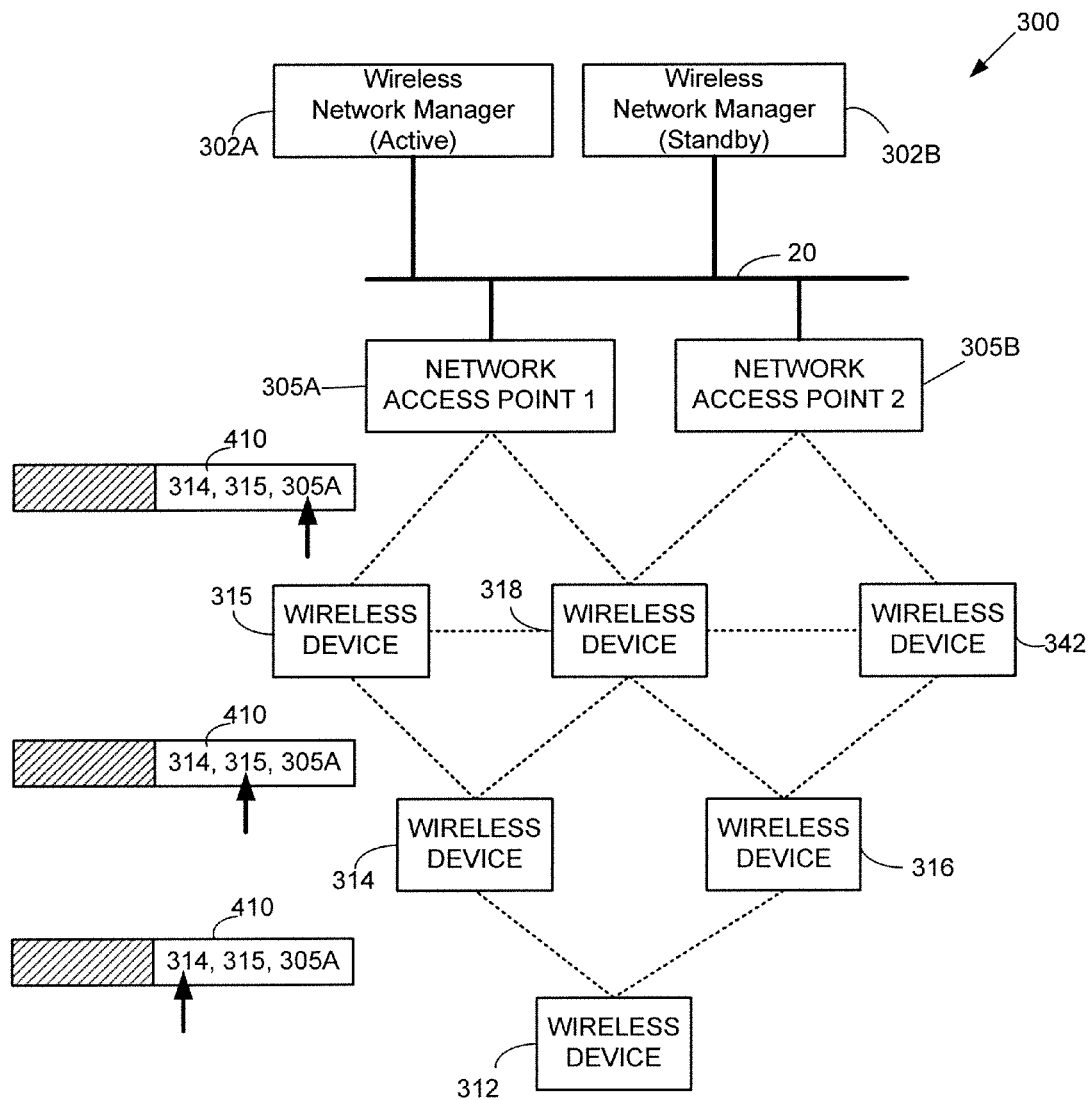

FIG. 12 is a block diagram illustrating downstream and upstream data paths in a wireless network utilizing some of the source routing techniques of the present disclosure.

Figure 13:
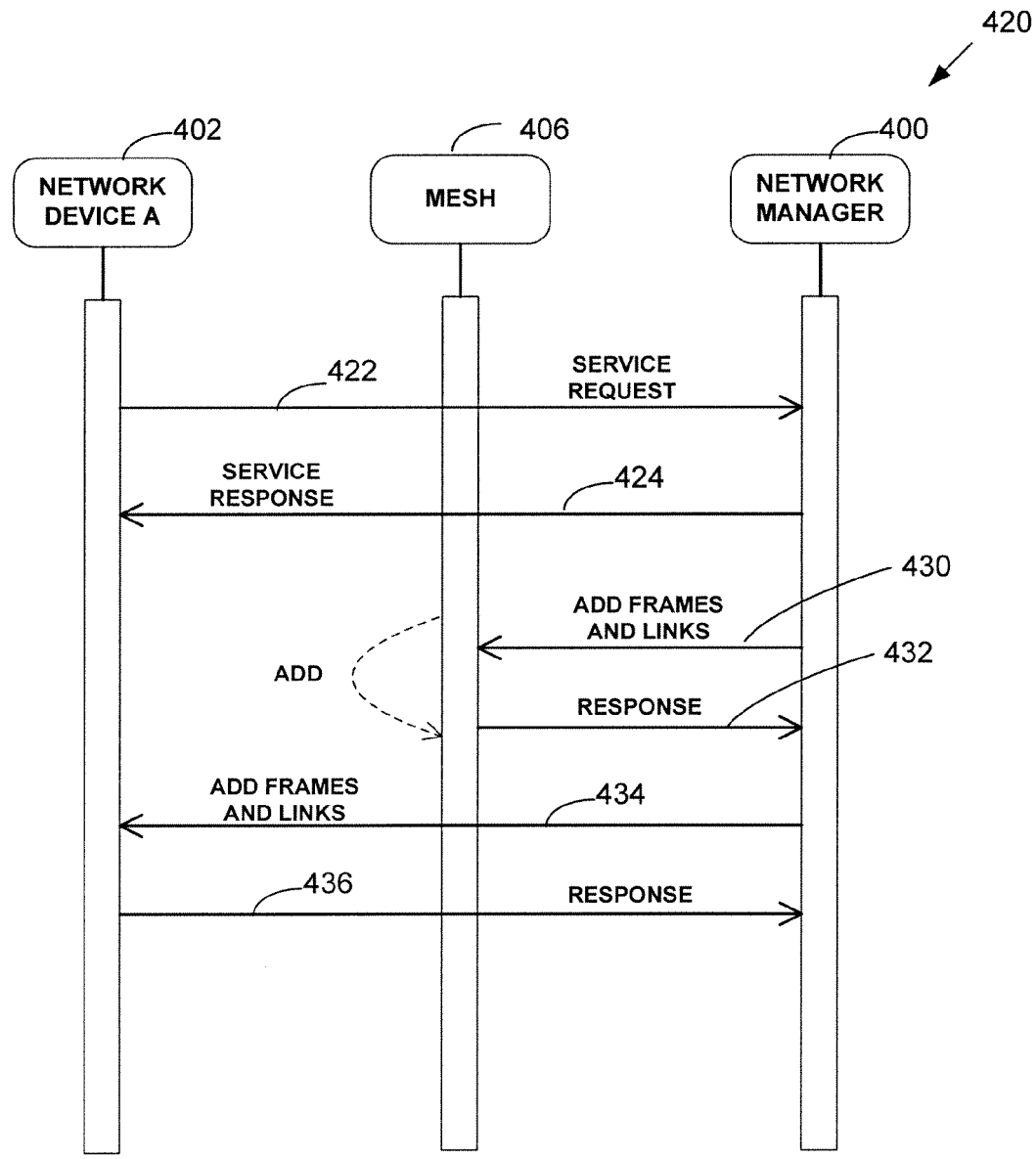

FIG. 13 is a message sequence diagram illustrating an exchange of messages between several network devices of FIG. 1, 10, or 12 related to allocating resources for publishing periodic process data by one of the network devices.

Figure 14:
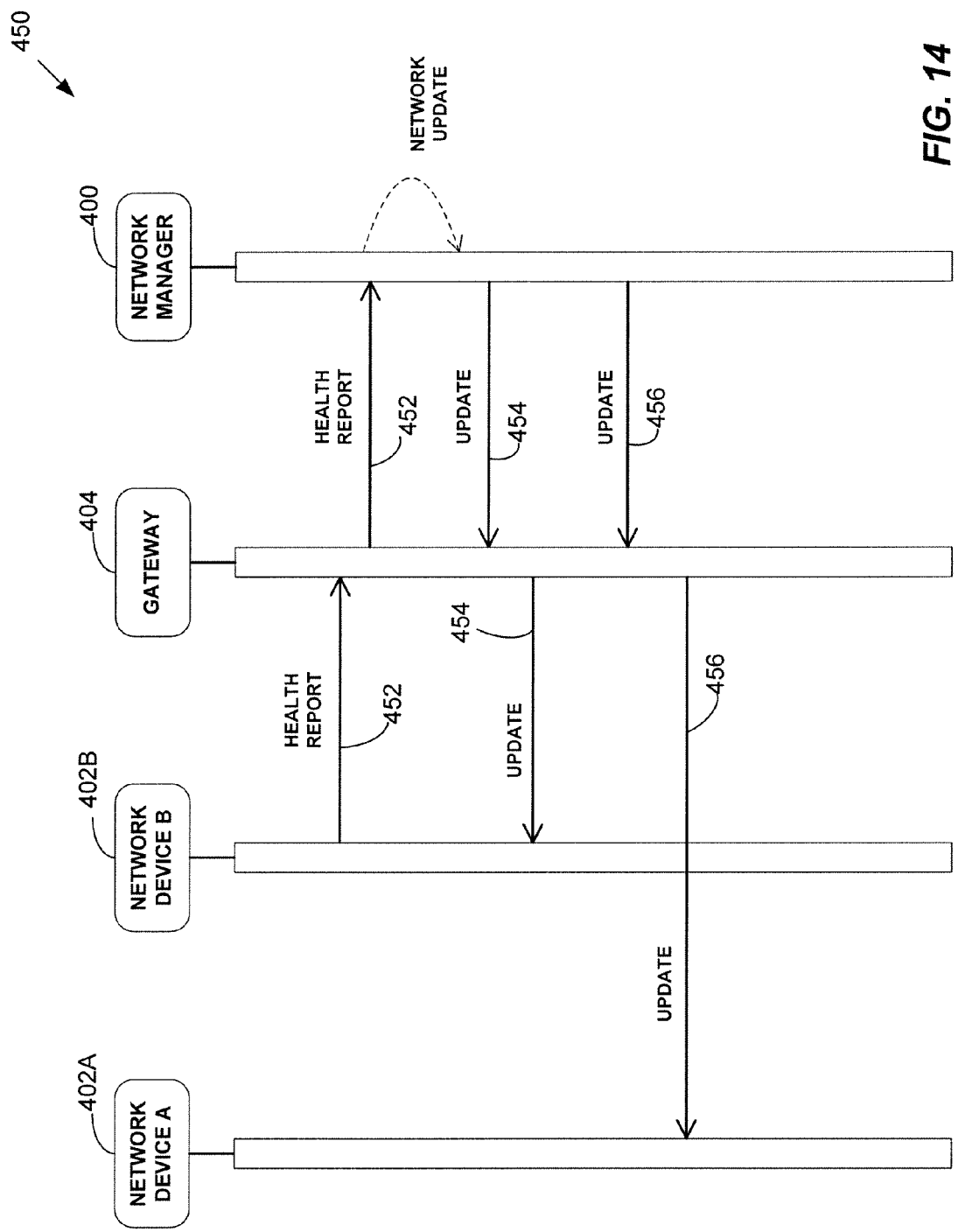

FIG. 14 is a message sequence diagram illustrating an exchange of messages between several network devices of FIG. 1, 10, or 12 related to updating the network schedule and/or network topology in view of a health report generated at one of the network devices.

Figure 15:
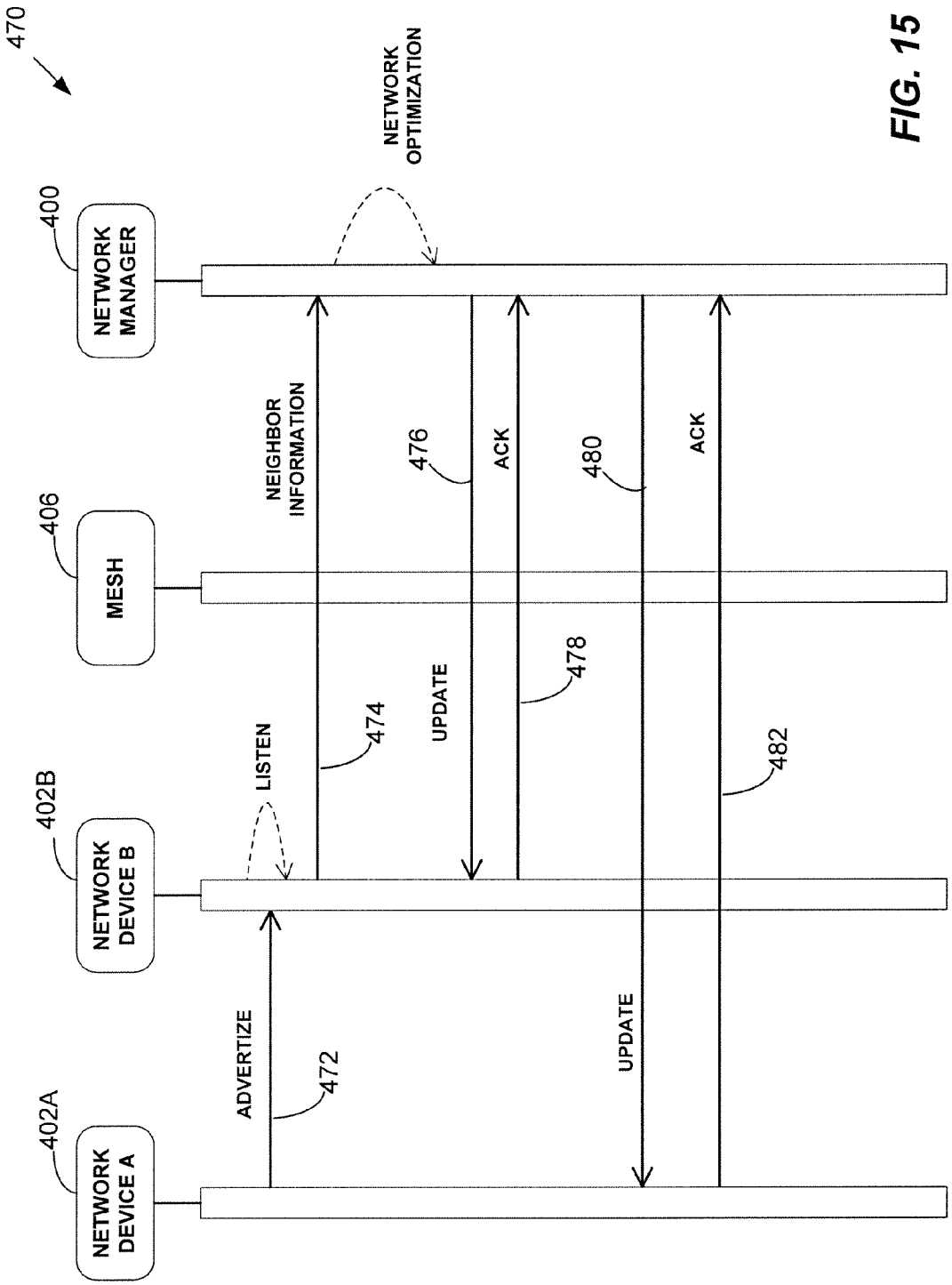

FIG. 15 is a message sequence diagram illustrating an exchange of messages between several network devices of FIG. 1, 10, or 12 related to updating the network schedule and/or network topology in view of a new wireless connection recognized by one of the network devices.

FIG. 16 is a message sequence diagram illustrating an exchange of messages between several network devices of FIG. 1, 10, or 12 related to updating the network schedule and/or network topology in view of a failure to deliver data from one of the network devices to another network device.

FIG. 17 is a message sequence diagram illustrating an exchange of messages between several network devices of FIG. 1, 10, or 12 related to allocating resources for a block mode transfer session between an external application and a network device.

DETAILED DESCRIPTION

FIG. 1 illustrates an exemplary network 10 in which the scheduling and routing techniques described herein may be used. In particular, the network 10 may include a plant automation network 12 connected to a wireless communication network 14. The plant automation network 12 may include one or more stationary workstations 16 and one or more portable workstations 18 connected over a communication backbone 20 which may be implemented using Ethernet, RS-485, Profibus DP, or using other suitable communication hardware and protocol. The workstations and other equipment forming the plant automation network 12 may provide various control and supervisory functions to plant personnel, including access to devices in the wireless network 14. The plant automation network 12 and the wireless network 14 may be connected via a gateway device 22. More specifically, the gateway device 22 may be connected to the backbone 20 in a wired manner and may communicate with the plant automation network 12 using any suitable (e.g., known) communication protocol. The gateway device 22, which may be implemented in any other desired manner (e.g., as a standalone device, a card insertable into an expansion slot of the host workstations 16 or 18, as a part of the input/output (IO) subsystem of a PLC-based or DCS-based system, etc.), may provide applications that are running on the network 12 with access to various devices of the wireless network 14. In addition to protocol and command conversion, the gateway device 22 may provide synchronized clocking used by time slots and superframes (sets of communication time slots spaced equally in time) of a scheduling scheme associated with a wireless protocol (referred to herein as a WirelessHART protocol) implemented in the network 14.

In some configurations, the network 10 may include more than one network access points 25 to improve the efficiency and reliability of the network 10. In particular, multiple network access point devices 25 may provide additional bandwidth for the communication between the wireless network 14 and the plant automation network 12, as well as the outside world. It should be understood that the gateway 22 and network access points 25 can be combined. In addition, the gateway 22 device may request bandwidth from the appropriate network service according to the gateway communication needs within the wireless network 14. A network manager software module 27, which may reside in the gateway device 22, may further reassess the necessary bandwidth while the system is operational. For example, the gateway device 22 may receive a request from a host residing outside of the wireless network 14 to retrieve a large amount of data. The gateway device 22 may then request the network manager 27 to allocate additional bandwidth to accommodate this transaction. For example, the gateway device 22 may issue an appropriate service request. The gateway device 22 may then request the network manager 27 to release the bandwidth upon completion of the transaction.

With continued reference to FIG. 1, the wireless network 14 may include one or more field devices 30-36. In general, process control systems, like those used in chemical, petroleum or other process plants, include field devices such as valves, valve positioners, switches, sensors (e.g., temperature, pressure and flow rate sensors), pumps, fans, etc. Generally speaking, field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adaptor (WHA) 50 or 50A. Additionally, the WHA 50 may support other communication protocols such as Foundation® Fieldbus, PROFIBUS, DeviceNet, etc. In these embodiments, the WHA 50 supports protocol translation on a lower layer of the protocol stack. Additionally, it is contemplated that a single WHA 50 may also function as a multiplexer and may support multiple HART or non-HART devices.

In general, the network manager 27 may be responsible for adapting the wireless network 14 to changing conditions and for scheduling communication resources. As network devices join and leave the network, the network manager 27 may update its internal model of the wireless network 14 and use this information to generate communication schedules and communication routes. Additionally, the network manager 27 may consider the overall performance of the wireless network 14 as well as the diagnostic information to adapt the wireless network 14 to changes in topology and communication requirements. Once the network manager 27 has generated the overall communication schedule, all or respective parts of the overall communication schedule may be transferred through a series of commands from the network manager 27 to the network devices.

To further increase bandwidth and improve reliability, the gateway device 22 may be functionally divided into a virtual gateway 24 and one or more network access points 25, which may be separate physical devices in wired communication with the gateway device 22. However, while FIG. 1 illustrates a wired connection 26 between the physically separate gateway device 22 and the access points 25, it will be understood that the elements 22-26 may also be provided as an integral device. Because the network access points 25 may be physically separated from the gateway device 22, the access points 25 may be strategically placed in several different locations with respect to the network 14. In addition to increasing the bandwidth, multiple access points 25 can increase the overall reliability of the network 14 by compensating for a potentially poor signal quality at one access point 25 using the other access point 25. Having multiple access points 25 also provides redundancy in case of a failure at one or more of the access points 25.

In addition to allocating bandwidth and otherwise bridging the networks 12 and 14, the gateway device 22 may perform one or more managerial functions in the wireless network 14. As illustrated in FIG. 1, a network manager software module 27 and a security manager software module 28 may be stored in and executed in the gateway device 22. Alternatively, the network manager 27 and/or the security manager 28 may run on one of the hosts 16 or 18 in the plant automation network 12. For example, the network manager 27 may run on the host 16 and the security manager 28 may run on the host 18. The network manager 27 may be responsible for configuration of the network 14, scheduling communication between wireless devices, managing routing tables associated with the wireless devices, monitoring the overall health of the wireless network 14, reporting the health of the wireless network 14 to the workstations 16 and 18, as well as other administrative and supervisory functions. Although a single active network manager 27 may be sufficient in the wireless network 14, redundant network managers 27 may be similarly supported to safeguard the wireless network 14 against unexpected equipment failures. Meanwhile, the security manager 28 may be responsible for protecting the wireless network 14 from malicious or accidental intrusions by unauthorized devices. To this end, the security manager 28 may manage authentication codes, verify authorization information supplied by devices attempting to join the wireless network 14, update temporary security data such as expiring secret keys, and perform other security functions.

With continued reference to FIG. 1, the wireless network 14 may include one or more field devices 30-36. In general, process control systems, like those used in chemical, petroleum or other process plants, include such field devices as valves, valve positioners, switches, sensors (e.g., temperature, pressure and flow rate sensors), pumps, fans, etc. Field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

In one embodiment, the wireless protocol supporting network devices 30-36 of the wireless network 14 is an extension of the known wired HART protocol, a widely accepted industry standard, that maintains the simple workflow and practices of the wired environment. In this sense, the network devices 30-36 may be considered WirelessHART devices. The same tools used for wired HART devices may be easily adapted to wireless devices 30-36 with a simple addition of new device description files. In this manner, the wireless protocol may leverage the experience and knowledge gained using the wired HART protocol to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, reduces the cost associated with developing and supporting devices that may be used with such networks. Some of the additional benefits of a wireless extension of the well-known HART protocol include access to measurements that were difficult or expensive to obtain with wired devices and the ability to configure and operate instruments from system software that can be installed on laptops, handhelds, workstations, etc. Another benefit is the ability to send diagnostic alerts from wireless devices back through the communication infrastructure to a centrally located diagnostic center. For example, every heat exchanger in a process plant could be fitted with a WirelessHART device and the end user and supplier could be alerted when a heat exchanger detects a problem. Yet another benefit is the ability to monitor conditions that present serious health and safety problems. For example, a WirelessHART device could be placed in flood zones on roads and be used to alert authorities and drivers about water levels. Other benefits include access to a wide range of diagnostics alerts and the ability to store trended as well as calculated values at the WirelessHART devices so that, when communications to the device are established, the values can be transferred to a host. In this manner, the WirelessHART protocol can provide a platform that enables host applications to have wireless access to existing HART-enabled field devices and the WirelessHART protocol can support the deployment of battery operated, wireless only HART-enabled field devices. The WirelessHART protocol may be used to establish a wireless communication standard for process applications and may further extend the application of HART communications and the benefits that this protocol provides to the process control industry by enhancing the basic HART technology to support wireless process automation applications.

Referring again to FIG. 1, the field devices 30-36 may be WirelessHART field devices, each provided as an integral unit and supporting all layers of the WirelessHART protocol stack. For example, in the network 14, the field device 30 may be a WirelessHART flow meter, the field devices 32 may be WirelessHART pressure sensors, the field device 34 may be a WirelessHART valve positioner, and the field device 36 may a WirelessHART pressure sensor. Importantly, the wireless devices 30-36 may support all of the HART features that users have come to expect from the wired HART protocol. As one of ordinary skill in the art will appreciate, one of the core strengths of the HART protocol is its rigorous interoperability requirements. In some embodiments, all WirelessHART equipment includes core mandatory capabilities in order to allow equivalent device types (made by different manufacturers, for example) to be interchanged without compromising system operation. Furthermore, the WirelessHART protocol is backward compatible to HART core technology such as the device description language (DDL). In the preferred embodiment, all of the WirelessHART devices should support the DDL, which ensures that end users immediately have the tools to begin utilizing the WirelessHART protocol.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adaptor (WHA) 50. Additionally, the WHA 50 may support other communication protocols such as Foundation® Fieldbus, PROFIBUS, DevicesNet, etc. In these embodiments, the WHA 50 supports protocol translation on a lower layer of the protocol stack. Additionally, it is contemplated that a single WHA 50 may also function as a multiplexer and may support multiple HART or non-HART devices.

Plant personnel may additionally use handheld devices for installation, control, monitoring, and maintenance of network devices. Generally speaking, handheld devices are portable equipment that can connect directly to the wireless network 14 or through the gateway devices 22 as a host on the plant automation network 12. As illustrated in FIG. 1, a WirelessHART-connected handheld device 55 may communicate directly with the wireless network 14. When operating with a formed wireless network 14, the handheld device 55 may join the network 14 as just another WirelessHART field device. When operating with a target network device that is not connected to a WirelessHART network, the handheld device 55 may operate as a combination of the gateway device 22 and the network manager 27 by forming its own wireless network with the target network device.

A plant automation network-connected handheld device (not shown) may be used to connect to the plant automation network 12 through known networking technology, such as Wi-Fi. This device communicates with the network devices 30-40 through the gateway device 22 in the same fashion as external plant automation servers (not shown) or the workstations 16 and 18 communicate with the devices 30-40.

Additionally, the wireless network 14 may include a router device 60 which is a network device that forwards packets from one network device to another network device. A network device that is acting as a router device uses internal routing tables to conduct routing, i.e., to decide to which network device a particular packet should be sent. Standalone routers such as the router 60 may not be required in those embodiments where all of the devices on the wireless network 14 support routing. However, it may be beneficial (e.g. to extend the network, or to save the power of a field device in the network) to add one or more dedicated routers 60 to the network 14.

All of the devices directly connected to the wireless network 14 may be referred to as network devices. In particular, the wireless field devices 30-36, the adapters 50, the routers 60, the gateway devices 22, the access points 25, and the wireless handheld device 55 are, for the purposes of routing and scheduling, network devices, each of which forms a node of the wireless network 14. In order to provide a very robust and an easily expandable wireless network, all of the devices in a network may support routing and each network device may be globally identified by a substantially unique address, such as a HART address, for example. The network manager 27 may contain a complete list of network devices and may assign each device a short, network unique 16-bit nickname. Additionally, each network device may store information related to update (or "scan") rates, connection sessions, and device resources. In short, each network device maintains up-to-date information related to routing and scheduling within the wireless network 14. The network manager 27 may communicate this information to network devices whenever new devices join the network or whenever the network manager 27 detects or originates a change in topology or scheduling of the wireless network 14.

Further, each network device may store and maintain a list of neighbor devices that the network device has identified during listening operations. Generally speaking, a neighbor of a network device is another network device of any type potentially capable of establishing a connection with the network device in accordance with the standards imposed by a corresponding network. In case of the WirelessHART network 14, the connection is a direct wireless connection. However, it will be appreciated that a neighboring device may also be a network device connected to the particular device in a wired manner. As will be discussed later, network devices promote their discovery by other network devices through advertisement, or special messages sent out during designated periods of time. Network devices operatively connected to the wireless network 14 have one or more neighbors which they may choose according to the strength of the advertising signal or to some other principle.

In the example illustrated in FIG. 1, each of a pair of network devices that are connected by a direct wireless connection 65 recognizes the other as a neighbor. Thus, network devices of the wireless network 14 may form a large number of inter-device connections 65. The possibility and desirability of establishing a direct wireless connection 65 between two network devices is determined by several factors, such as the physical distance between the nodes, obstacles between the nodes (devices), signal strength at each of the two nodes, etc. In general, each wireless connection 65 is characterized by a large set of parameters related to the frequency of transmission, the method of access to a radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (e.g., 2.4 GHz). While the system and method discussed herein may be applied to a wireless network operating on any designated frequency or range of frequencies, the example embodiment discussed below relates to the wireless network 14 operating in the unlicensed, or shared part of the radio spectrum. In accordance with this embodiment, the wireless network 14 may be easily activated and adjusted to operate in a particular unlicensed frequency range as needed.

With continued reference to FIG. 1, two or more direct wireless connections 65 may form a communication path between nodes that cannot form a direct wireless connection 65. For example, the direct wireless connection 65A between the WirelessHART hand-held device 55 and WirelessHART device 36, along with the direct wireless connection 65B between the WirelessHART device 36 and the router 60, may form a communication path between the devices 55 and 60. As discussed in greater detail below, at least some of the communication paths may be directed communication paths (i.e., permitting data transfer in only one direction between a pair of devices). Meanwhile, the WirelessHART device 36 may directly connect to each of the network devices 55, 60, 32, and to the network access points 25A and 25B. In general, network devices operating in the wireless network 14 may originate data packets, relay data packets sent by other devices, or perform both types of operations. As used herein, the term "end device" refers to a network device that does not relay data packets sent by other devices and term "routing device" refers to a network device that relays data packets traveling between other network devices. Of course, a routing device may also originate its own data. One or several end devices and routing devices, along with several direct connections 65, may thus form a part of a mesh network.

Because a process plant may have hundreds or even thousands of field devices, the wireless network 14 operating in the plant may include a large number of nodes and, in many cases, an even larger number of direct connections 65 between pairs of nodes. As a result, the wireless network 14 may have a complex mesh topology, and some pairs of devices that do not share a direct connection 65 may have to communicate through many intermediate hops to perform communications between these devices. Thus, a data packet may sometimes need to travel along many direct connections 65 after leaving a source device but before reaching a destination device, and each direct connection 65 may add a delay to the overall delivery time of the data packet. Moreover, some of these intermediate devices may be located at an intersection of many communication paths of a mesh network. As such, these devices may be responsible for relaying a large number of packets originated by many different devices, possibly in addition to originating its own data. Consequently, a relatively busy intermediate device may not forward a transient data packet immediately, and instead may queue the packet for a relatively significant amount of time prior to sending the packet to a next node in the corresponding communication path. When the data packet eventually reaches the destination device, the destination device may reply with an acknowledgement packet which may also encounter similar delays. During the time the packet travels to the destination device and the corresponding acknowledgment packet travels back to the originating device from the destination device, the originating node may not know whether the data packet has successfully reached the destination device. Moreover, devices may leave the wireless network 14 due to scheduled maintenance and upgrades or due to unexpected failures, thus changing the topology of the mesh network and destroying some of the communication paths. Similarly, the devices may join the wireless network 14, adding additional direct connections 65. These and other changes to the topology of the wireless network 14 may significantly impact data transmissions between pairs of nodes if not processed in an efficient and timely manner.

Importantly, however, the efficiency of delivering data packets may largely determine the reliability, security, and the overall quality of plant operations. For example, a data packet including measurements indicative of an excessive temperature of a reactor should quickly and reliably reach another node, such as the hand-held device 55, so that the operator or a controller may immediately take the appropriate action and address a dangerous condition if necessary. To efficiently utilize the available direct wireless connections 65 and properly adjust to the frequently changing network topology, the network manager 27 may maintain a complete network map 68, define a routing scheme that connects at least some pairs of network devices 30-50, and communicate the relevant parts of the routing scheme to each network device that participates in the routing scheme.

In particular, the network manage 27 may define a set of directed graphs including one or more unidirectional communication paths, assign a graph identifier to each defined directed graph, and may communicate a relevant part of each graph definition to each corresponding network device, which may then update the device-specific, locally stored connection table 69. As explained in more detail below, the network devices 30-50 may then route data packets based on the graph identifier included in the headers or the trailers of the data packets. If desired, each connection table 69 may only store routing information directly related to the corresponding network device, so that the network device does not know the complete definition of a directed graph which includes the network device. In other words, the network device may not "see" the network beyond its immediate neighbors and, in this sense, the network device may be unaware of the complete topology of the wireless network 14. For example, the router device 60 illustrated in FIG. 1 may store a connection table 69A, which may only specify the routing information related to the neighboring network devices 32, 36, 50, and 34. Meanwhile, the WHA 50A may store a connection table 69B, which accordingly may specify the routing information related to the neighbors of the WHA 50A.

As used herein, the term "graph" is generally consistent with the field of Graph Theory. The methods of graph routing discussed below involve, in part, sending a data packet along a set of devices. More specifically, the methods of routing data packets along unidirectional graphs allow for multiple devices included in a unidirectional graph to source a data packet traveling to a common destination, which may also be referred to as a sink. Each device in a graph may only be aware of the immediate neighbors that are also members of the same graph (but a single device may participate in multiple graphs, each associated with one or more neighbors.)

In some cases, the network manager 27 may define duplicate communication paths between pairs of network devices to ensure that a data packet may still reach the destination device along the secondary communication path if one of the direct connections 65 of the primary communication path becomes unavailable. However, some of the direct connections 65 may be shared between the primary and the secondary path of a particular pair of network devices. Moreover, the network manager 27 may, in some cases, communicate the entire communication path to be used to a certain network device, which may then originate a data packet and include the complete path information in the header or the trailer of the data packet. Preferably, network devices use this method of routing for data which does not have stringent latency requirements. As discussed in detail below, this method (referred to herein as "source routing") may not provide the same degree of reliability and flexibility and, in general, may be characterized by longer delivery delays.

Another one of the core requirements of a wireless network protocol (and particularly of a wireless network operating in an unlicensed frequency band) is the minimally disruptive coexistence with other equipment utilizing the same band. Coexistence generally defines the ability of one system to perform a task in a shared environment in which other systems can similarly perform their tasks while conforming to the same set of rules or to a different (and possibly unknown) set of rules. One requirement of coexistence in a wireless environment is the ability of the protocol to maintain communication while interference is present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the particular system may ask what impact the transmitted signal of one transmitter has on other radio system operating in proximity to the particular system. More specifically, the operator may ask whether the transmitter disrupts communication of some other wireless device every time the transmitter turns on or whether the transmitter spends excessive time on the air effectively "hogging" the bandwidth. Ideally, each transmitter should be a "silent neighbor" that no other transmitter notices. While this ideal characteristic is rarely, if ever, attainable, a wireless system that creates a coexistence environment in which other wireless communication systems may operate reasonably well may be called a "good neighbor." The second aspect of coexistence of a wireless system is the ability of the system to operate reasonably well in the presence of other systems or wireless signal sources. In particular, the robustness of a wireless system may depend on how well the wireless system prevents interference at the receivers, on whether the receivers easily overload due to proximate sources of RF energy, on how well the receivers tolerate an occasional bit loss, and similar factors. In some industries, including the process control industry, there are a number of important potential applications in which the loss of data is frequently not allowable. A wireless system capable of providing reliable communications in a noisy or dynamic radio environment may be called a "tolerant neighbor."

Effective coexistence (i.e., being a good neighbor and a tolerant neighbor) relies in part on effectively employing three aspects of freedom: time, frequency and distance. Communication can be successful when it occurs 1) at a time when the interference source (or other communication system) is quiet; 2) at a different frequency than the interference signal; or 3) at a location sufficiently removed from the interference source. While a single one of these factors could be used to provide a communication scheme in the shared part of the radio spectrum, a combination of two or all three of these factors can provide a high degree of reliability, security and speed.

Still referring to FIG. 1, the network manager 27 or another application or service running on the network 14 or 12 may define a master network schedule 67 for the wireless communication network 14 in view of the factors discussed above. The master network schedule 67 may specify the allocation of resources such as time segments and radio frequencies to the network devices 25 and 30-55. In particular, the master network schedule 67 may specify when each of the network devices 25 and 30-55 transmits process data, routes data on behalf of other network devices, listens to management data propagated from the network manager 27, and transmits advertisement data for the benefit of devices wishing to join the wireless network 14. To allocate the radio resources in an efficient manner, the network manager 27 may define and update the master network schedule 67 in view of the topology of the wireless network 14. More specifically, the network manager 27 may allocate the available resources to each of the nodes of the wireless network 14 (i.e., wireless devices 30-36, 50, and 60) according to the direct wireless connections 65 identified at each node. In this sense, the network manager 27 may define and maintain the network schedule 67 in view of both the transmission requirements and of the routing possibilities at each node.

The master network schedule 67 may partition the available radio sources into individual communication channels, and further measure transmission and reception opportunities on each channel in such units as Time Division Multiple Access (TDMA) communication timeslots, for example. In particular, the wireless network 14 may operate within a certain frequency band which, in most cases, may be safely associated with several distinct carrier frequencies, so that communications at one frequency may occur at the same time as communications at another frequency within the band. One of ordinary skill in the art will appreciate that carrier frequencies in a typical application (e.g., public radio) are sufficiently spaced apart to prevent interference between the adjacent carrier frequencies. For example, in the 2.4 GHz band, IEEE assigns frequency 2.455 to channel number 21 and frequency 2.460 to channel number 22, thus allowing the spacing of 5 KHz between two adjacent segments of the 2.4 GHz band. The master network schedule 67 may thus associate each communication channel with a distinct carrier frequency, which may be the center frequency in a particular segment of the band.

Meanwhile, as typically used in the industries utilizing TDMA technology, the term "timeslot" refers to a segment of a specific duration into which a larger period of time is divided to provide a controlled method of sharing. For example, a second may be divided into 10 equal 100 millisecond timeslots. Although the master network schedule 67 preferably allocates resources as timeslots of a single fixed duration, it is also possible to vary the duration of the timeslots, provided that each relevant node of the wireless network 14 is properly notified of the change. To continue with the example definition of ten 100-millisecond timeslots, two devices may exchange data every second, with one device transmitting during the first 100 ms period of each second (i.e., the first timeslot), the other device transmitting during the fourth 100 ms period of each second (i.e., the fourth timeslot), and with the remaining timeslots being unoccupied. Thus, a node on the wireless network 14 may identify the scheduled transmission or reception opportunity by the frequency of transmission and the timeslot during which the corresponding device may transmit or receive data.

As part of defining an efficient and reliable network schedule 67, the network manager 27 may logically organize timeslots into cyclically repeating sets, or superframes. As used herein, a superframe may be more precisely understood as a series of equal superframe cycles, each superframe cycle corresponding to a logical grouping of several adjacent time slots forming a contiguous segment of time. The number of time slots in a given superframe defines the length of the superframe and determines how often each time slot repeats. In other words, the length of a superframe, multiplied by the duration of a single timeslot, specifies the duration of a superframe cycle. Additionally, the timeslots within each frame cycle may be sequentially numbered for convenience. To take one specific example, the network manager 27 may fix the duration of a timeslot at 10 milliseconds and may define a superframe of length 100 to generate a 1-second frame cycle (i.e., 10 milliseconds multiplied by 100). In a zero-based numbering scheme, this example superframe may include timeslots numbered 0, 1, . . . 99.

As discussed in greater detail below, the network manager 27 reduces latency and otherwise optimizes data transmissions by including multiple concurrent superframes of different sizes in the network schedule 67. Moreover, some or all of the superframes of the network schedule 67 may span multiple channels, or carrier frequencies. Thus, the master network schedule 67 may specify the association between each timeslot of each superframe and one of the available channels.

Thus, the master network schedule 67 may correspond to an aggregation of individual device schedules. For example, a network device, such as the valve positioner 34, may have an individual device schedule 67A. The device schedule 67A may include only the information relevant to the corresponding network device 34. Similarly, the router device 60 may have an individual device schedule 67B. Accordingly, the network device 34 may transmit and receive data according to the device schedule 67A without knowing the schedules of other network devices such as the schedule 69B of the device 60. To this end, the network manager 27 may manage both the overall network schedule 67 and each of the individual device schedules 67 (e.g., 67A and 67B) and communicate the individual device schedules 67 to the corresponding devices when necessary. In other embodiments, the individual network devices 25 and 35-50 may at least partially define or negotiate the device schedules 67 and report these schedules to the network manager 27. According to this embodiment, the network manager 27 may assemble the network schedule 67 from the received device schedules 67 while checking for resource contention and resolving potential conflicts.

To optimally utilize the available wireless resources and to guarantee efficient and reliable delivery of data, the network manager 27 may further optimize scheduling decisions in view of routing or, alternatively, optimize routing in view of the scheduling decisions. In some particularly useful embodiments, the network manager 27 may conceptually combine routing concepts such as edges of directed graphs with scheduling resources such as timeslots and superframes to define links. The links may further include several distinct types such as dedicated links associated with a known pair of devices, shared links where least one of a transmitter or a receiver is not pre-assigned, broadcast and multicast links used for addressing multiple devices from a single source, etc. In these embodiments, the network manager 27 may efficiently use link resources by analyzing the topology of the network 14, forming a set of directed graphs to specify communication paths between pairs of network devices, defining superframes based on, in part, the update rates at the network devices, and sequentially allocating timeslots within the defined superframes to the directed connections between the devices to define a set of links specifying both the direction and the time of each data transmission. Additionally, each link may specify the channel on which a particular transmission occurs in those embodiments where the network 14 operates on several wireless channels. As discussed in detail below, the network manager 27 may thereby ensure that the network devices communicate both efficiently and reliably. For example, the network manager 27 may ensure that on a multi-hop communication path, a data packet spends as little time as possible before a transfer to the next hop in the path.

Figure 2:
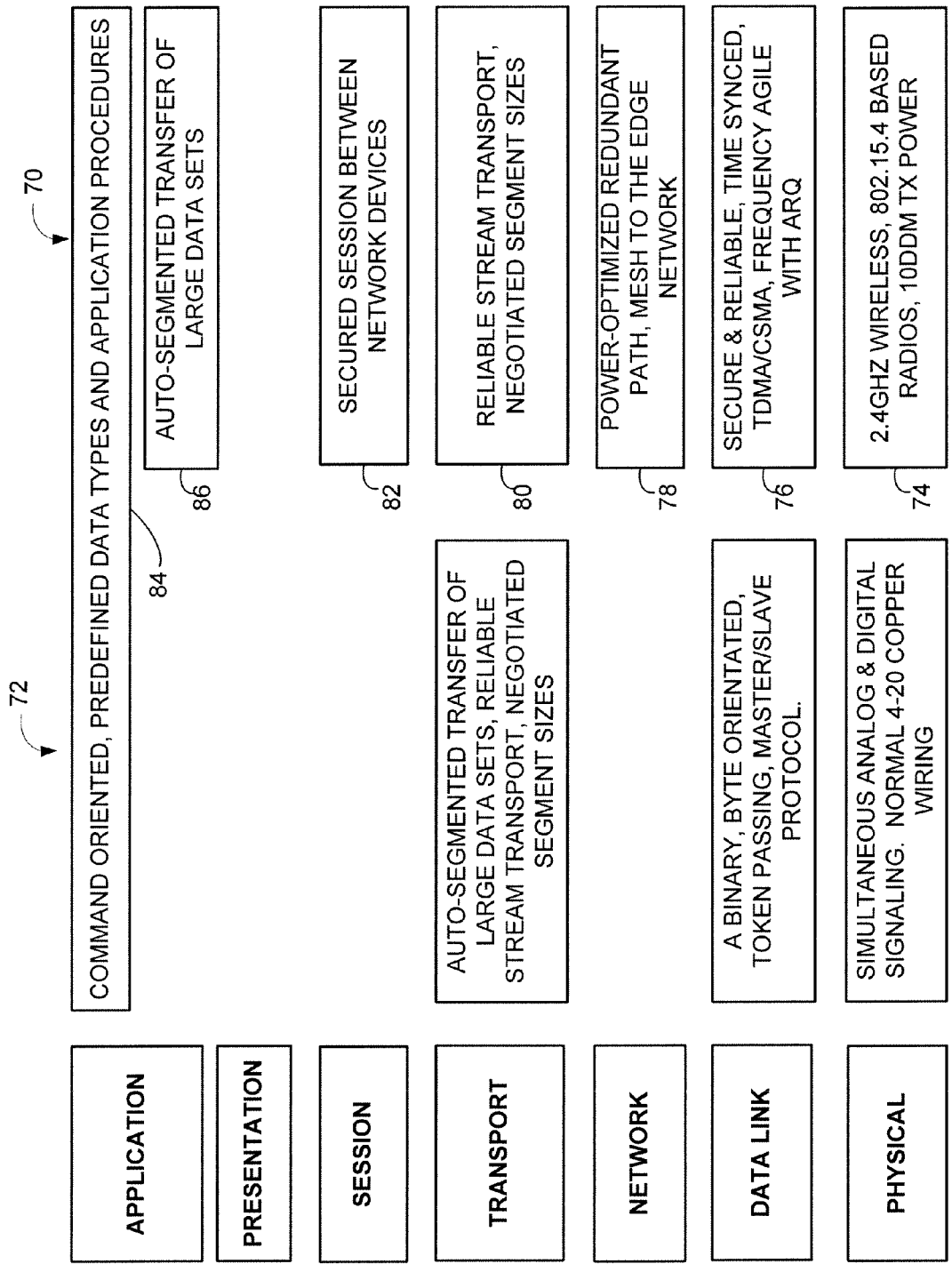
FIG. 2 is a schematic representation of the layers of a wireless HART protocol which may be used in the wireless network illustrated in FIG. 1.

The communication protocol supporting the wireless network 14 generally described above is referred to herein as the WirelessHART protocol 70, and the operation of this protocol is discussed in more detail with respect to FIG. 2. As will be understood, each of the direct wireless connections 65 may transfer data according to the physical and logical requirements of the WirelessHART protocol 70. Meanwhile, the WirelessHART protocol 70 may efficiently support communications within timeslots and on the carrier frequencies associated with the superframes defined by the device-specific schedules 69.

FIG. 2 schematically illustrates the layers of one example embodiment of the WirelessHART protocol 70, approximately aligned with the layers of the well-known ISO/OSI 7-layer model for communications protocols. By way of comparison, FIG. 2 additionally illustrates the layers of the existing "wired" HART protocol 72. It will be appreciated that the WirelessHART protocol 70 need not necessarily have a wired counterpart. However, as will be discussed in detail below, the WirelessHART protocol 70 can significantly improve the convenience of its implementation by sharing one or more upper layers of the protocol stack with an existing protocol. As indicated above, the WirelessHART protocol 70 may provide the same or greater degree of reliability and security as the wired protocol 72 servicing a similar network. At the same time, by eliminating the need to install wires, the WirelessHART protocol 70 may offer several important advantages, such as the reduction of cost associated with installing network devices, for example. It will be also appreciated that although FIG. 2 presents the WirelessHART protocol 70 as a wireless counterpart of the HART protocol 72, this particular correspondence is provided herein by way of example only. In other possible embodiments, one or more layers of the WirelessHART protocol 70 may correspond to other protocols or, as mentioned above, the WirelessHART protocol 70 may not share even the uppermost application layer with any of the existing protocols.

As illustrated in FIG. 2, the wireless expansion of HART technology may add at least one new physical layer (e.g., the IEEE 802.15.4 radio standard) and two data-link layers (e.g., wired and wireless mesh) to the known HART implementation. In general, the WirelessHART protocol 70 may be a secure, wireless mesh networking technology operating in the 2.4 GHz ISM radio band (block 74). In one embodiment, the WirelessHART protocol 70 may utilize IEEE 802.15.4b compatible direct sequence spread spectrum (DSSS) radios with channel hopping on a transaction by transaction basis. This WirelessHART communication may be arbitrated using TDMA to schedule link activity (block 76). As such, all communications are preferably performed within a designated time slot. One or more source and one or more destination devices may be scheduled to communicate in a given slot, and each slot may be dedicated to communication from a single source device, or the source devices may be scheduled to communicate using a CSMA/CA-like shared communication access mode. Source devices may send messages to one or more specific target devices or may broadcast messages to all of the destination devices assigned to a slot.

Because the WirelessHART protocol described herein allows deployment of mesh topologies, a significant network layer 78 may be specified as well. In particular, the network layer 78 may enable establishing direct wireless connections 65 between individual devices and routing data between a particular node of the wireless network 14 (e.g., the device 34) and the gateway 22 via one or more intermediate hops. In some embodiments, pairs of network devices 30-50 may establish communication paths including one or several hops while in other embodiments, all data may travel either upstream to the gateway device 22 or downstream from the gateway device 22 to a particular node.

To enhance reliability, the WirelessHART protocol 70 may combine TDMA with a method of associating multiple radio frequencies with a single communication resource, e.g., channel hopping. Channel hopping provides frequency diversity which minimizes interference and reduces multi-path fading effects. In particular, the data link 76 may create an association between a single superframe and multiple carrier frequencies which the data link layer 76 cycles through in a controlled and predefined manner. For example, the available frequency band of a particular instance of the WirelessHART network 14 may have carrier frequencies $F_1, F_2, \ldots F_n$. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link layer 76 of the WirelessHART protocol 70 may offer an additional feature of channel blacklisting, which restricts the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the WirelessHART network 14. In some embodiments, the WirelessHART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple WirelessHART networks 14, the network manager 27 may create an overall schedule for each instance of the WirelessHART network 14. The schedule may be organized into superframes containing time slots numbered relative to the start of the superframe. Additionally, the network manager 27 may maintain a global absolute slot count which may reflect the total of number of time slots scheduled since the start-up of the WirelessHART network 14. This absolute slot count may be used for synchronization purposes.

The WirelessHART protocol 70 may further define links or link objects in order to logically unite scheduling and routing. In particular, a link may be associated with a specific network device, a specific superframe, a relative slot number, one or more link options (transmit, receive, shared), and a link type (normal, advertising, discovery). As illustrated in FIG. 2, the data link layer 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

With continued reference to FIG. 2, the transport layer 80 of the WirelessHART protocol 70 allows efficient, best-effort communication and reliable, end-to-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis. In contrast, reliable communications allow devices to send acknowledgement packets. In addition to guaranteeing data delivery, the transport layer 80 may order packets sent between network devices. This approach may be preferable for request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the WirelessHART network 14 to activate a new superframe. Alternatively, a field device such as the sensor 30 may generate a packet and propagate the request to another field device such as to the portable HART communicator 55. As another example, an alarm or event generated by the 34 field device may be transmitted as a request directed to the gateway device 22. In response to successfully receiving this request, the gateway device 22 may generate a response packet and send the response packet to the device 34, acknowledging receipt of the alarm or event notification.

Referring again to FIG. 2, the session layer 82 may provide session-based communications between network devices. End-to-end communications may be managed on the network layer by sessions. A network device may have more than one session defined for a given peer network device. If desired, almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the WirelessHART protocol 70 and the wired HART protocol 72 may support a common HART application layer 84. The application layer of the WirelessHART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Scheduling Communications

Figure 4:
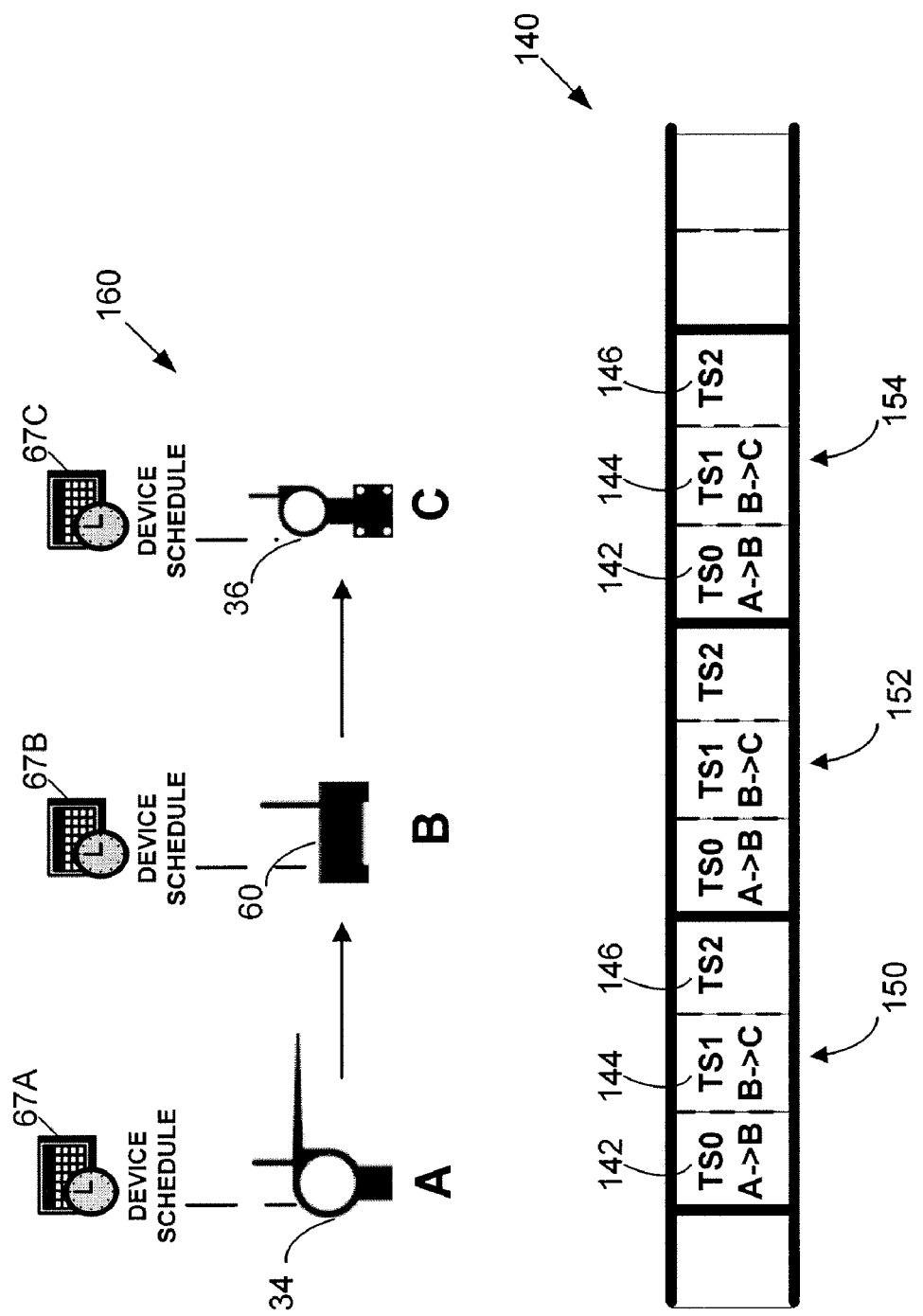
FIG. 4 is a block diagram that illustrates an exemplary association of timeslots of a three-slot superframe with several communicating devices.

FIGS. 3-6 provide a more detailed illustration of channel and timeslot resource allocation supported by the data link layer 76 and the network layer 78 of the WirelessHART protocol 70. As discussed above in reference to FIG. 1, the network manager 27 may manage the definition of one or more superframes and may associate individual timeslots within each of the defined superframes with one of the available channels (e.g., carrier frequencies). By way of one specific example, FIG. 3 illustrates a possible communication scheme within an individual timeslot, while FIG. 4 illustrates an example data exchange between several devices using the timeslots of a certain superframe. Next, FIG. 5 illustrates a possible association between an example timeslot and several available channels, and FIG. 6 is a schematic representation of several concurrent superframes which include the timeslots illustrated in FIGS. 3-5.

Referring specifically to FIG. 3, two or more network devices may exchange data in a timeslot 100, which may be a dedicated timeslot shared by one transmitting device and one receiving device or a shared timeslot having more than one transmitter and/or one or more receivers. In either case, the timeslot 100 may have a transmit schedule 102 and a receive schedule 104. In other words, one or more transmitting devices may communicate within the timeslot 100 according to the transmit timeslot schedule 102 while one or more receiving devices may communicate within the timeslot 100 according to the receive timeslot schedule 104. Of course, the timeslot schedules 102 and 104 are substantially precisely synchronized and begin at the same relative time 106. Over the course of the timeslot 100, a transmitting network device sends a predetermined amount of data over a communication channel such as a carrier radio frequency. In some cases, the transmitting network device may also expect to receive a positive or negative acknowledgement within the same timeslot 100.

Thus, as illustrated in FIG. 3, the transmit timeslot schedule 102 may include a transmit segment 110 for transmitting outbound data, preceded by a pre-transmission segment 112, and may include a receive segment 122 for receiving an acknowledgement for the data transmitted during the segment 110. The transmit segment 110 may be separated from the receive segment 122 by a transition segment 116, during which the corresponding network device may adjust the hardware settings, for example. Meanwhile, the receive schedule 104 may include segments for performing functions complementary to those carried out in the segments 112-122, as discussed below.

In particular, the transmitting device may send out the entire packet or stream segment associated with a capacity of the timeslot 100 during the segment 110. As mentioned above, the network schedule 67 may include shared timeslots which do not exclusively belong to an individual device schedule 67 of one of the network devices 25 and 30-55. For example, a shared timeslot may have a dedicated receiver such as the gateway device 22 but no single dedicated transmitter. When necessary, one of the network devices 25-60 may transmit unscheduled information, such as a request for additional bandwidth, over the shared timeslot. In these cases, the potentially transmitting device may check whether the shared timeslot is available by performing Clear Channel Assessment (CCA) in a pre-transmission segment 112. In particular, the transmitting network device may listen to signals propagated over the communication channel associated with the timeslot 100 for the duration of the pre-transmission segment 112 to confirm that no other network device is attempting to use the timeslot 100.

On the receiving end of the timeslot 100, the receiving device may receive the entire packet associated with the timeslot 100 within a packet receive segment 114. As illustrated in FIG. 3, the packet receive segment 114 may begin at an earlier point in time than the transmit segment 110. Next, the transmit timeslot schedule 102 requires that the transmitting device transition the radio mode in a transition segment 116. Similarly, the receive timeslot schedule 104 includes a transition segment 118. However, the segment 116 may be shorter than the segment 118 because the transmitting device may start listening for acknowledgement data early to avoid missing a beginning of an acknowledgement.

Still further, the transmit schedule 102 may include an acknowledgement receive segment 122 during which the transmitting device receives an acknowledgement transmitted during an acknowledgement transmit segment 124 associated with the receive schedule 104. The transmitting device may delete the packet transmitted during the transmit segment 110 from an associated transmit queue upon receiving a positive acknowledgement. On the other hand, the transmitting device may attempt to re-transmit the packet in the next scheduled dedicated timeslot or in the next available shared timeslot if no acknowledgement arrives or if the acknowledgement is negative.

Several timeslots 100 discussed above may be organized into a superframe 140, as schematically illustrated in FIG. 4. In particular, the superframe 140 may include a (typically) infinite series of superframe cycles 150-154, each cycle including a set if timeslots, illustrated in FIG. 4 as a timeslot 142 with a relative timeslot number 0 (TS0), a timeslot 144 with a relative timeslot number 1 (TS1), and a timeslot 146 with a relative timeslot number 2 (TS2). Accordingly, the size of the superframe 140 of FIG. 4 is three timeslots. In other words, each of the timeslots 142-146 of the superframe 140 repeats in time at an interval of two intermediate timeslots. Thus, for a 10 millisecond timeslot, the interval between the end of a timeslot with a particular relative slot number and the beginning of a next timeslot with the same relative slot number is 20 milliseconds. Conceptually, the timeslots 142-146 may be further grouped into superframe cycles 150-154. As illustrated in FIG. 4, each superframe cycle corresponds to a new instance of a sequence of timeslots 142-146.

The master network schedule 67 may associate transmission and reception opportunities of some of the network devices participating in the wireless network 14 with particular timeslots of the superframe 140. Referring again to FIG. 4, a network fragment 160 schematically illustrates a partial communication scheme implemented between the network devices 34, 60, and 36 of FIG. 1. To simplify the illustration of the superframe 140, the network devices 34, 60, and 36 are additionally designed in FIG. 4 as nodes A, B, and C, respectively. Thus, according to FIG. 4, the node A transmits data to the node B which, in turn, transmits data to the node C. As discussed above, each of the nodes A-C includes a device schedule 67A-C, which specifies the timeslots and channels (e.g., radio carrier frequencies) for transmitting and receiving data at the corresponding device. The master network schedule 67 may include part of all of the data information stored in the individual device schedules 67A-C. More specifically, the network manager 27 may maintain the master network schedule 67 as an aggregate of the schedules associated with each of the network devices 30-50, including the device schedules 67A-C.

In this example, the duration of the timeslot 100 (FIG. 3) may be 10 milliseconds and the network device A may report data to the device C every 30 milliseconds. Accordingly, the network manager 27 may set the length of the superframe 140 at three timeslots specifically in view of the update rate of the network device A. Further, the network manager 27 may assign the timeslot 142 with a relative number 0 (TS0) to the network devices A and B, with the device A as the transmitter and the device B as the receiver. The network manager 27 may further allocate the next available timeslot 144, having the relative slot number 1 (TS1), to be associated with the transmission from the device B to the device C. Meanwhile, the timeslot 146 remains unassigned. In this manner, the superframe 140 provides a scheme according to which the network manager 27 may allocate resources in the network fragment 160 for the transmission of data from the device A to the device C in view of the available wireless connections between the devices A, B, and C.

In the example illustrated in FIG. 4, the network device at node A may store information related to the timeslot 142 as part of its device schedule 67A. Similarly, the network device at node B may store information related to the timeslots 142 (receive) and 144 (transmit) as part of its device schedule 69B. Finally, the network device C may store information related to the timeslot 144 in the device schedule 67C. In at least some of the embodiments, the network manager 27 stores information about the entire superframe 140, including an indication that the timeslot 146 is available.

Importantly, the superframe 140 need not be restricted to a single radio frequency or other single communication channel. In other words, the individual timeslots 142-146 defining the superframe 140 may be associated with different radio frequencies on a permanent or floating basis. Moreover, the frequencies used by the various devices need not always be adjacent in the electromagnetic spectrum. In one embodiment, for example, the timeslot 142 of each of the superframe cycles 150-154 may be associated with a carrier frequency $F_1$ and the timeslot 144 of each of the superframe cycles 150-154 may be associated with a carrier frequency $F_2$, with the frequencies $F_1$ and $F_2$ being adjacent or non-adjacent in the electromagnetic spectrum.

In another embodiment, at least some of the timeslots 142-146 may move about the allocated frequency band in a predefined manner. FIG. 5 illustrates an example association of the timeslot 144 of FIG. 4 with channels 172-179 (corresponding to frequency sub-bands $F_1$-$F_5$) in the available frequency band 170. In particular, each of the channels 172-179 may correspond to one of the center frequencies $F_1, F_2, \ldots F_5$ which preferably differ from their respective neighbors by the same offset. The channels 172-179 preferably form a continuous section of the spectrum covering the entire available frequency band 170, although the channels 172-179 need be contiguous or form a continuous band in all embodiments. The superframe 140 may use at least a portion of the frequency band 170, so that one or more of the timeslots 142-146 are scheduled on different carrier frequencies in at least two consecutive cycles.

As illustrated in FIG. 5, the timeslot 144 may use the channel 176 (frequency $F_3$) during the frame cycle 150, may use the channel 174 (frequency $F_4$) during the frame cycle 152, and may use the channel 178 (frequency $F_2$) during the frame cycle 154. The timeslot 144 may then "return" to the channel 176 in the next superframe cycle 150A, which may similar to the cycle 150. Each of the specific associations of the timeslot 144 with one of the channels 172-179 is illustrated as a timeslot/channel tuple 144A-C. For example, the tuple 144A specifies the timeslot 2 scheduled, in the cycle 150, on the channel 176 associated with the center frequency $F_3$. Similarly, the tuple 144B specifies the timeslot 2 scheduled, in the cycle 152, on the channel 174 associated with the center frequency $F_4$. Meanwhile, the channel 172 associated with the center frequency $F_5$ may not be assigned to the timeslot 2 during any of the cycles 150-152. However, a different timeslot of the superframe 140 such as the timeslot 146, for example, may be associated with the channel 172 during one or more of the cycles 150-152.

In this example, the frequency assignment associated with the superframe cycle 150 may repeat immediately following the cycle 154 (illustrated as a cycle 150A in the FIG. 5), and the timeslot 144 may again correspond to the tuple 144A after two cycles of the superframe 140. Thus, the timeslot 144 may regularly cycle through the channels 176, 174, and 178. It will be appreciated that the timeslot 144 may similarly cycle through a greater or smaller number of channels irrespective of the length of the superframe 140, provided, of course, that enough channels are available in the frequency band 170. The association of a single timeslot with multiple channels during different superframe cycles, discussed above with respect to FIG. 5 and referred to herein as "channel hopping," significantly increases the reliability of the wireless network 14. In particular, channel hopping reduces the probability that a pair of devices, scheduled to communicate in a particular timeslot of a certain superframe, fail to transmit and receive data when a certain channel is jammed or otherwise unavailable. Thus, for example, the failure of the channel 174 prevents the devices using the timeslot 144 from communicating in the frame cycle 152 but not during the frame cycles 150 or 154.

Referring again to FIG. 4, the device schedules 67B and 67C may include the information regarding each of the tuples 144A-C discussed above in reference to FIG. 5. In particular, each of the device schedules 67B and 67C may store an assignment of the timeslot 144 to one of the channels 172-179 within each of the cycles 150-152. The master network schedule 67 (FIG. 1) may similarly include this information. Meanwhile, the device schedule 67A need not necessarily include the information related to the timeslot 144 because the corresponding node A (the device 34) does not communicate during the timeslot 144 of the superframe 140. In operation, the devices 60 and 36 corresponding to the nodes B and C may prepare for data transmission and reception, respectively, at the beginning of each timeslot 144. To determine whether the timeslot 144 currently corresponds to the tuple 144A, 144B, or 144C, the devices 60 and 36 may apply the global absolute slot count to determine whether the timeslot 144 is currently in the frame cycle 150, 152, or 154.

In the process of defining the network schedule 67, the network manager 27 may define multiple concurrent superframes in view of the update rates of the network devices 25 and 35-50. As illustrated in FIG. 6, the network schedule 67 may include the superframe 140 of length three as well superframes 190 and 192. The superframe 190 may be a five-slot superframe and the superframe 192 may be a four-slot superframe, although the different superframes may have a different number of slots and various different superframes may have the same number of slots. As illustrated in FIG. 6, the superframes need not necessarily align with respect to the relative slot numbers. In particular, at a particular time 194, the superframe 190 may schedule the timeslot with the relative number two (TS2) while the superframes 140 and 192 may schedule the timeslots with the relative number one (TS1). Preferably, the superframes 140, 190, and 192 are time-synchronized so that each transition to a new timeslot within each of these superframes occurs at the same time.

Each of the superframes 140, 190 and 192 may be primarily associated with, or "belong to" an individual one of or a subset of the network devices 30-50. For example, the superframe 140 illustrated in FIG. 4 may belong to the node A (i.e., the network device 34), and the length of the superframe 140 may be advantageously selected so that the node A sends out measurement data to the node B during the timeslot 142 (TS0) once during each of the cycles 150-154. In case the wireless network 14 defines 10 millisecond timeslot, the node A sends data to the node B once every 30 milliseconds. If, however, the node A is reconfigured to report measurements once every 50 milliseconds, the network manager 27, alone or in cooperation with the node A, may reconfigure the frame 140 to have a length of five timeslots instead. In other words, the length of each superframe may reflect a particular transmission requirement of a particular network device 30-50.

On the other hand, more than one network device 30-50 may use a superframe for transmitting or receiving data. Referring again to FIG. 4, the node B (the network device 60) may regularly transmit data to the node C (the network device 36) in the timeslot 144 of the superframe 140, although the superframe 140 may be primarily associated with the node A. Thus, different timeslots of a particular superframe may be used by different network devices to originate, route, or receive data. In a sense, the timeslots of each superframe may be understood as a resource allocated to different devices, with a particular priority assigned to the device that "owns" the superframe. Further, it will be appreciated that each network device may participate in multiple superframes. For example, the network device 34 in FIG. 4 may route data on behalf of other network devices (e.g., the network device 32 illustrated in FIG. 1), in addition to propagating its own data via the router device 60. Preferably, a device participating in multiple superframes does not schedule simultaneous communications in different superframes. While only three superframes are illustrated in FIG. 6, the wireless network 14 of FIG. 1 may include any number of superframes, with each of the different superframes having any desired or useful length based on the types and frequencies of communication being performed in or between particular devices and set of devices.

The methods described above with respect to FIGS. 1-6 may be applied to a process control system, for example, in which various devices report measurements or other data according to individual device schedules, as well during occasional, frequently unpredictable, data "bursts."

Routing Techniques

As generally discussed above in reference to FIG. 1, it is important to consider the location of the network devices 30-50 so that the wireless network 14 can establish itself in an efficient and reliable form. In some cases, it may be necessary to add routers 60 in those locations where plant equipment could block or seriously affect a wireless connection. Thus, in this and in similar situations, it is desirable that the wireless network 14 be "self-healing," i.e., capable of automatically addressing at least some of the delivery failures. To meet this and other design requirements, the wireless network 14 may define redundant paths and schedules so that in response to detecting a failure of one or more direct wireless connections 65, the network 14 may route data via an alternate route. Moreover, the paths may be added and deleted without shutting down or restarting the wireless network 14. Because some of the obstructions or interference sources in many industrial environments may be temporary or mobile, the wireless network 14 may be capable of automatically reorganizing itself. More specifically, in response to one or more predetermined conditions, pairs of network devices (e.g., 32 and 34, 60 and 36, etc.) may recognize each other as neighbors and thus create a new direct wireless connection 65 or, conversely, dissolve the existing direct wireless connections 65. Additionally, the network manager 27 may create, delete, or temporarily suspend paths between non-neighboring devices.

Irrespective of whether a particular network configuration is permanent or temporary, the wireless network 14 generally requires a fast and reliable method of routing data between nodes. In one possible embodiment, the network manager 27 may analyze the information regarding the layout of the network, the transmission capability and update rate of each network device 32-50, as well as other relevant information. The network manager 27 may then define routes and schedules in view of these factors. When defining routes and schedules, the network manager 27 may recognize the wireless network 140 as conforming to one of several network topologies compatible with the routing and scheduling techniques of the present disclosure.

FIGS. 7-9 schematically illustrate some of these network topologies. For the sake of clarity, each of FIGS. 7-9 illustrates bidirectional connections between pairs of devices. However, it will be appreciated that each of the topologies illustrated in FIGS. 7-9 is also compatible with unidirectional connections or mixed bidirectional and unidirectional connections (i.e., including both bidirectional and unidirectional connections). Moreover, each connection illustrated in FIGS. 7-9 may support several unidirectional connections in one or both directions, with each unidirectional connection associated with a particular time of transmission, for example. Referring specifically to FIG. 7, a network 350 may have a star network topology. The star network 350 includes a routing device 352 and one or more end devices 254. The routing device 352 may be a network device arranged to route data while the end device 254 may be a network device arranged to send data only on its own behalf and to only receive (or decode) data addressed to the end device 254. Of course, the routing device 352 may also be a recipient and originator of data and may perform routing functions in addition to other tasks. As illustrated in FIG. 7, end devices 254 may have a direct connection 265 to the routing device 352 but end devices 254 cannot be connected directly in a star topology. The direct connection 265 may be a direct wireless connection 65 or a wired connection.

The end device 254 may be the same type of physical device as the routing device 352 and may be physically capable of routing data. The routing capability of the end device 254 may be disabled during the installation of the end device 254 or in operation of a corresponding network (such as the WirelessHART network 14). Moreover, the routing capability of the end device 254 may be disabled by the end device 254 itself or by a dedicated service such as the network manager 27. In some sense, the star network 350 corresponds to the simplest of possible topologies. It may be appropriate for small applications that require low power consumption and low latency. Additionally, it will be noted that the star network 350 is deterministic because there is only one possible route between the routing device 352 and a particular end device 254. A star topology is also inherently unreliable.

Now referring to FIG. 8, a network 270 is arranged in a mesh network topology. Each network device of the mesh network 270 is a routing device 352. Mesh networks provide a robust network with multiple paths between various devices. In wireless applications, mesh networks are better able to adapt to changing radio environments. For example, the device 274 of the network 270 may send data to the device 276 via an intermediate hop 278 or an intermediate hop 380, provided that the corresponding paths 382-388 allow transmission in this direction. As illustrated in FIG. 8, both a path 382 and a path 384 enable the routing device 274 to send data to the routing device 276, providing redundancy and thus improved reliability to the network 270.

Another type of network topology is illustrated in FIG. 9. The network 390 incorporates elements of both star and mesh topologies. In particular, the star mesh network 390 includes several routing devices 352 (labeled "R") and end devices 254 (labeled "E"). The routing devices 352 may be connected in a mesh format and may support redundant paths. The selection of a particular topology may be performed automatically by a network component, such as the network manager 27, or by a user configuring the network. In particular, the user may choose to override the topology selected by the network manager 27 or the default topology associated with the WirelessHART protocol 70. It is contemplated that in most applications, mesh topology may be the default topology because of the inherent reliability, efficiency, and redundancy of this topology. Clearly, because WirelessHART devices may act as router devices, several different configurations may be compatible with the same physical disposition of field devices and routers.

Both source routing and graph routing may be applied to the topologies discussed in reference to FIGS. 4-6. Although both types of routing may be equally useful in different situations, graph routing will be discussed first. Generally, in mathematical theories and applications, a graph is a set of vertices (nodes such as 352 or 254) and edges (direct connections 65 or 265). The WirelessHART protocol 70 or another protocol servicing the wireless network 14 or 140 may use graphs to configure paths connecting communication endpoints such as the device 30 to the gateway 22 illustrated in FIG. 1, for example. In some embodiments, graphs and the associated paths are configured by the network manager 27. The network manager 27 may also configure individual network devices such as field devices 30-40, routers 60, etc. with partial graph and path information, which may be stored in the connection tables 69. The wireless network 14 may contain multiple graphs, some of which may overlap. Further, a certain network device may have paths of multiple graphs going through the device, and some of the paths may direct data to the same neighbor of the device. Preferably, every graph in a network is associated with a unique graph identifier. Graphs can run upstream, downstream, or between devices. Graphs can also be associated with broadcast or multicast communications.

The protocol servicing the wireless network 14 or 140 (such as the WirelessHART protocol 70) may be configured to operate with a number of different topologies to support various application requirements. As a result, the wireless network 14 or 140 may concurrently support several methods of routing, such as unidirectional graph routing and source routing, for example. Although the forthcoming examples of a wireless network support these two approaches, it will be appreciated that the wireless network 14 or 140 may additionally support bidirectional graph routing, or may route data using only of these techniques. However, irrespective of a type and number of concurrent routing techniques, each device on the wireless network 14 or 140 may be assigned a unique network address. Once every potential receiver of data acquires some form of unambiguous identification with respect to other network elements, decisions related to routing may be made by individual devices such as field devices 30-40, by a centralized dedicated service such as the network manager 27, or by individual devices acting in cooperation with the centralized service. As indicated above, at least one possible implementation of the wireless network 14 may rely on the network manager 27 to carry out most or all of the routing decisions and to communicate the relevant data to the network devices 30-50 to be stored in the connection tables 69. Further, routing decisions can be made at the originating point (i.e. at the source of a data packet) or at a centralized location. Moreover, routing decisions can be adjusted at each intermediate stop, or "hop," in the path of the packet from the source to a destination.

In the examples discussed below, a wireless network provides at least two approaches to routing that may be selected according to the specific requirements and conditions of a given system, such as the physical layout of the network elements that make up the system, the number of elements, the expected amount of data to be transmitted to and from each element, etc. Moreover, the two approaches may be used by the wireless network at the same time and each may be selectively applied to a particular type of data or to a particular host or a set of hosts in view of certain aspects of performance of each of the two approaches. For example, a measurement of a process variable or a command to open a valve may tolerate a relatively small delay in delivery and the wireless network 14 may accordingly apply the faster and the more reliable of the two methods. Meanwhile, a device configuration command or a response may tolerate a longer delay and may be suitable for the other approach.

As briefly indicated above, it is common for a certain distributed control networks and, in particular, to networks connecting devices in the process control industry, to direct data to a certain device for management, diagnostic, log collection, and other purposes. FIGS. 7-9 illustrate several perspectives of a wireless network 300 which implements data transfer in two general directions: toward a gateway 202 (referred to herein as the "upstream" direction) and away from the gateway 202 (referred to herein as the "downstream" direction). For security reasons, the network 300 does not allow direct data transfer between peer field devices although the technique described herein could be used in such a situation if so desired.

FIG. 10 illustrates upstream routing in the network 300. In particular, the network manager 302A (or the stand-by network manager 302B) may define several directed graphs, each graph including either the network access point 305A or a second network access point 305B as the terminal node. In other words, the paths of each graph in the exemplary network 300 lead to and terminate at one of the two gateway devices 305A or 305B. Specifically, a graph 310 (shown in solid bold arrows) may include network devices 312, 314, 316, 318, and the gateway 305A wherein the paths associated with the graph 310 may include direct wireless connections 320, 322, 324, 326, and 328. A graph 340 (shown in dotted bold arrows) may include network devices 312, 316, 318, 342, and the gateway 305A, with a path that includes direct wireless connections 344, 346, 348, 350, and 352. In the directed graph 310, the network device 312 may be called the head of the directed graph 310 and the gateway device 305A may be called the tail of the directed graph 310. Similarly, the network device 312 is the head of the directed graph 340 and the gateway device 305B is the tail of the directed graph 340. The network manager 302A or, under certain operating conditions, a backup network manager 302B may define the graphs 310 and 340 and may communicate complete or partial definitions of these graphs 310 and 340 to the network devices 312-318 and 342. As discussed above in reference to FIG. 1, the network devices 312-318 and 342 may maintain up-to-date versions of the connection tables 69 storing these partial path definitions. In some embodiments, the gateway devices 305A-B may not require the information regarding the graphs 310 and 340 if the corresponding communication path terminates at one the gateway devices 305A-B. However, it will be appreciated that the gateway devices 305A-B may also originate data and may store information regarding one or more graphs with paths originating from the gateway devices 305A-B. It will be further noted that in general, a path of a certain graph may traverse the gateway device 305A or 305B as an intermediate node; however, the exemplary network 300 defines paths that always either originate or terminate at one of the gateway devices 305A or 305B.

To send a data packet along a certain graph, a source network device may include an identifier of the graph in the header or trailer of the data packet. The data packet may travel via the paths corresponding to the graph identifier until it either reaches its destination or is discarded. To be able to route packets in the graph 310, for example, a connection table 69 of each network device that belongs to the graph 310 may contain entries that include the graph identifier and address of a neighbor network device which (1) belongs to the same graph, and (2) is one hop closer to the destination. For example, the network device 316 may store the following connection table:

| GRAPH IDENTIFIER | NODE |
|---|---|
| GRAPH_310 | 318 |
| GRAPH_340 | 318 |
| GRAPH_340 | 342 | while the network device 342 may store the following information in the connection table:

| GRAPH IDENTIFIER | NODE |
|---|---|
| GRAPH_340 | 302 |

It will be noted that the network device 342 could alternatively store an entry for the graph 340 directing a data packet to the node 305B if the network access point 305B is a separate physical device. While the exemplary connection tables above simply list the devices associated with a particular entry, it will be noted that the NODE column of the connection table may store the address of the neighboring device as defined in the addressing scheme of the network 300 or WirelessHART network 14.

In another embodiment, the NODE column may store the nickname of the neighboring device, an index into an array storing full or short addresses of the neighbors, or any other means of unambiguously identifying a network device. Alternatively, the connection table may store graph identifier/wireless connection tuples as illustrated below:

| GRAPH IDENTIFIER | CONNECTION |
|---|---|
| GRAPH_310 | 326 |
| GRAPH_340 | 346 |
| GRAPH_340 | 348 |

In other words, the connection table may list one or more direct wireless connections 65 corresponding to a particular graph. The network device 316 may, for example, consult the connection table and transmit a packet carrying the graph identifier 340 via the direct wireless connection 346 or 348.

As illustrated in FIG. 10 and in the tables above, redundant paths may be set up by having more than one neighbor associated with the same graph identifier. Thus, a data packet arriving at the network device 316 and containing the graph identifier 340 in the header or trailer may be routed to either the network device 318 or to the network device 342. While executing a routing operation, the network device 316 may perform a lookup in the connection table by the graph identifier 340, and send the packet to either (or both) of the network devices 318 or 342. Moreover, the routing selection between two or more possible hops may be random or may be carried out according to a predefined algorithm. For example, the selection may be made in consideration of a load balancing objective or in view of the delivery statistics. Thus, the network device 316 may learn, through a peer network device or from the network manager 27, that selecting the network device 318 as the next hop while routing packets along the graph 340 has a lower probability of delivering the packet successfully or has a longer expected or average delay in delivery. The network device 316 may then attempt to route more or possibly all of the packets associated with the graph 340 to the network device 342.

In one embodiment, a neighbor device acknowledges the receipt of a data packet by sending a confirmation packet. In the example above, once the neighboring network device 318 or 342 acknowledges receipt of the packet, the network device 316 may immediately release it. If, on the other hand, the acknowledgement is not received within a predefined time period, the network device 316 may attempt to route the packet via the alternate hop or path. Additionally, the network device 316 may collect statistics of both successful delivery attempts and of failed delivery attempts. The subsequent routing decisions, such as selecting between the hops 318 and 342, may include or be based on the adjusted statistical data. Of course, the network device 316 may apply the statistics related to network devices 318 and 342 to other relevant graphs and may also communicate the statistics to other network devices, either directly or via the network manager 27.

As discussed above, in the graph routing approach, a network device sends packets with a graph identifier in a network header along a set of paths to the destination. Importantly, a graph identifier alone is sufficient for routing packets and, while other routing information may be also included in the header, each packet can be properly delivered based solely on the graph identifier. All network devices on the way (i.e., on the path) to the destination may be pre-configured with graph information that specifies the neighbors to which the packets may be forwarded. Because graph routing requires pre-configuration of intermediate network devices for each potential destination, graph routing may be better suited for communications from a network device to a gateway and from a gateway to a network device.

Now referring to FIG. 11, the network manager 302A or 302B may also support routing downstream with respect to one or both of the gateways 305A-B. In particular, a graph 380 (shown in solid bold arrows) may include the nodes 315, 314, and 312, and the direct wireless connections 382-386. The gateway device 305A is the head of the graph 380 and wireless device 312 is the tail of the graph 380. Meanwhile, a graph 390 (shown in dotted bold arrows) may similarly connect the gateway device 305A to the wireless device 312, with the gateway device 305A as the head of the graph 390. However, the graph 390 may include the nodes 305A, 318, 342, 316, and 312, and the direct connections 392-298. Thus, to send a data packet to the wireless device 312, the gateway device 305A may include a graph identifier in the header or the trailer of the data packet which corresponds to either the graph 380 or 390. It will be appreciated that each of the graphs 380 or 390 may also include duplicate connection paths to ensure reliability and that, in general, the network manager 302A or 302B may use techniques similar to those discussed above in reference to FIG. 7. Also, it will be noted that the connection table 69 of each of the wireless devices 312-318 and 342 may include graph route information related to both downstream and upstream graphs used for routing purposes.

Each of the wireless networks 14 or 300 may also use another routing technique based which may be referred to as superframe routing. In a particular embodiment, each network layer protocol data unit (NPDU) may include a superframe identifier in addition to as a replacement for the graph identifier. For example, the same field in the NPDU header may store either the graph identifier or the superframe identifier. An intermediate network device may initially attempt to locate one or more entries for the graph identifier supplied in the NPDU in the device-specific connection table 69A-B, for example, and, if the graph identifier does not match any of the entries of the connection table 69A-B or if the graph identifier is absent from the data packet, the intermediate network device may rely on the superframe identity to advance the data packet. More specifically, the intermediate network device may transmit the data packet in the superframe matching the superframe identity specified in the NPDU (if the superframe is available at this intermediate network device). In one embodiment, the intermediate network device may transmit this data packet to any neighbor device with a link associated with the superframe. It is contemplated that in these cases, the intermediate network device may transmit this data packet more than once.

As illustrated in FIG. 12, the wireless network 300 may additionally use source routing. In source routing, pre-configuration of the relaying devices is not necessary. To send a packet to its destination using source routing, the source network device may include, in the header of a data packet, for example, an ordered list of devices through which the data packet must travel. The ordered list of devices may effectively define a communication path for the data packet. As the packet traverses the specified path, each routing device may extract the next node address from the packet to determine where the data packet should travel next, i.e., where the next data packet should be sent in the next hop. Consequently, source routing requires advance knowledge of the topology of the network 14. If, however, a certain network device does not find itself on the routing list, the network device may send the packet according to the included graph information, or send the packet in a specified superframe (i.e., by using the superframe routing technique discussed above), or broadcast the data packet, and/or send a failure message to the network manager 302A-B. Because each data packet preferably includes a graph identifier even when the data packet also includes a complete path definition for source routing, it is possible to forward the data packet in case of a failure to route the data packet at the source node or at one of the intermediate nodes using the source routing mechanism. Thus, if the supplied graph identifier corresponds to one of the frame identifiers at the network device, this network device may send the packet in the superframe. If these attempts to route the data packet fail, the network device may then choose to broadcast the packet because it is possible that some other network device has a connection to the destination device. Generally with respect to source routing, it will be noted that this technique allows packets to go to an arbitrary destination without an explicit or preconfigured setup of intermediate devices. The table below summarizes the factors which a network device may consider to determine whether to continue to use source routing, send the data packet using the graph identifier included in the data packet, transmit in the appropriate superframe, broadcast, or generate a failure message for the network manager 305A-B:

send the list 310 along with the packet to the first hop or device on the list, i.e., the network device 314. The network device 314 may then traverse the list 310, locate the identity of the network device 314, extract this field from the list 310, identify the network device 315 as the next hop for the received packet, and finally send the data packet to the network device 315. The source routing list may reside in the optional area of the network header, and may be of variable size depending on number of hops to the destination. Similarly, the network device 315 may traverse the list 310, locate its own address or identity, and send the data packet to the next hop or device in the list 310 (in this case, the gateway device 305A).

In general, only those network devices that have obtained full network information from the network manager 27 or 302A-B use source routing because only the network manager 27 or 302A-B knows the complete topology of the network. An additional limitation of source routing is that it provides no redundancy at intermediate network devices because each packet is originated with a header or a trailer that explicitly specifies each intermediate hop and does not provide any routing alternatives. Thus, if one of the intermediate network devices fails to relay the packet as specified by the packet header or trailer, the delivery of the packet fails. It is therefore the responsibility of the network manager 27 or 302A-B to detect the failure and reprogram or reconfigure the source with an alternate route. To facilitate the detection of such error cases, the wireless network 14, 140, or 300 may require network devices to send a routing failure notification to the network manager 27 or 302A-B. Accordingly, a protocol such as the WirelessHART protocol 70 may provide a

| ROUTING | | DESTINATION ADDRESS | | |
|---|---|---|---|---|
| Source | Graph | DLPDU | NPDU | ACTION |
| Yes | Yes | Unicast | Don't care | Forward the data packet (NPDU) to the next address specified in the source route list. If the source route is exhausted or fails, transmit in the superframe corresponding to the graph identifier. |
| Yes | Yes | Broadcast | Don't care | Continue broadcasting according to the graph identifier, i.e., to the nodes in the graph. Use the broadcast link in the corresponding graph. |
| Yes | No | Don't care | Unicast | Forward the data packet to the next address specified in the source route list or signal a source route error if unsuccessful. |
| Yes | No | Don't care | Broadcast | Forward the data packet to the next address in the source route. |
| No | Yes | Broadcast | Don't care | The graph identifier field stores the superframe identifier. Continue broadcasting the NPDU using the broadcast link in the superframe. |
| No | Yes | Unicast | Unicast | Forward the NPDU along the graph (using any normal link to a neighbor on the graph). Signal a graph route error if the end of the graph has not been reached or if the next neighbor is not in the neighbor table. |
| No | Yes | Unicast | Broadcast | Forward the NPDU to all neighbors in the graph. At the end of graph, discard the NPDU. |

For example, the network device 312 may send a packet to the gateway device 305A by specifying the complete path in the packet header or the packet trailer. As illustrated in FIG. 12, the network device 312 may generate a list 310 containing the addresses of network devices 314, 315, and 305A and message type or an information element in the protocol definition for reporting this and other types of delivery failures. In another embodiment, the routing list 310 (referring to FIG. 9) may specify alternate routes in addition to the route selected by the sender. In yet another embodiment, primary and one or more alternate routes may be partially merged to avoid duplication of common parts of the path in the packet header or trailer.

Referring generally to FIGS. 1, 3, and 10-12, the network manager 27 or 302A-B may maintain a list of all devices in the network. The network manager 27 or 302A-B may also contain the overall network topology including a complete graph of the network and the up-to-date portions of the graph that have been communicated to each device. The network manager 27 or 302A-B may generate the route and connection information using the information that the network manager 27 receives from the network devices 30-40, 50, 60, 55, etc. The network manager 27 or 302A-B may then build the graph of the network from the list of network devices and the neighbors reported by each network device. Referring back to FIG. 1, for example, the network device 50B may report "seeing" the neighbor devices 60 and 34. The network manager may be also responsible for generating and maintaining all of the route information for the network. In one embodiment, there is always one complete network route and several special purpose routes which are used to send setpoint and other settings from the gateways 302A or 302B to the final control commands (FIGS. 7-9). Further, broadcast routes (which flow through most or all of the devices in the network) may be used to send broadcast messages from the network manager 27, 114, or 302A-B to all of the devices of the network 14 or 300. Still further, the network manager 27, 114, or 302A-B may also carry out the scheduling of network resources once the routing information and burst mode update rates are known.

When devices are initially added to the network 14, 140, or 300, the corresponding network manager may store all neighbor entries as reported from each network device. The network manager 27, 114, or 302A-B may use this information to build an initial complete network graph and to revise the graphs during operation. The network graph is put together optimizing several properties including hop count, reporting rates, power usage, and overall traffic flow as reflected by the statistics gathering discussed above. One key aspect of the topology is the list of connections that connect devices together. Because the presence and health of individual connections may change over time, the network manager 27, 114, or 302A-B may be additionally programmed or configured to update the overall topology, which may include adding and deleting information in each network device. In some embodiments, only the network manager 27, 114, or 302A-B and the gateway 22 or 302A-B may know enough information to use source routing. More specifically, it may be desirable to prevent peer-to-peer communication between any two arbitrary devices for security purposes.

In short, graph routing may direct traffic both upstream and downstream with respect to the network manager 27 or gateway 22 and both graph and source routes can be optimized to satisfy applications with low latency requirements, which includes measurement information that is transferred from network devices to the gateway and control information that is transferred from gateway devices to final control commands such as regulating valves, on-off valves, pumps, fans, dampers, as well as motors used in many other ways.

In some embodiments, path redundancy may be a matter of policy of the network manager 27, 114, or 302A-B rather than a coincidental overlap of graphs. In other words, the network manager 27, 114, or 302A-B may attempt to select at least two neighbors for each device. Thus, the network manager 27, 114, or 302A-B may be configured to actively pursue a mesh or a star mesh topology. The supporting protocol, such as the WirelessHART protocol 70, may thus provide a very high end-to-end data reliability. From the physical perspective, each field device or other network device should be within communication range of at least two other devices that can receive messages from the field device and forward them.

The network manager 27, 114, or 302A-B may additionally verify each graph definition in order to ensure that no loops have been formed. In those embodiments where the network manager 27, 114, or 302A-B actively pursues path redundancy and defines many graphs of various size, a communication path may be sometimes erroneously defined to direct data packets from a source back to the same source. In accordance with such faulty graph definition, a packet may be routed back to the source directly from the source or may visit one or more intermediate hops prior to arriving back at the source. Loop verification may be performed each time the topology of the associated network changes, such as due to an addition or removal of a device, or whenever the network manager 27 adjusts the routing graphs and schedules for any reason. Alternatively, the network manager 27 may perform loop checking periodically as a background task.

Combining Routing and Scheduling Decisions

In a wireless network such as the wireless network 14 or 300, the same graph route may be used with several schedules. In particular, a packet may be transmitted along the same route while the network schedule changes and the time at which the packet is sent from and to a certain node is updated. In this sense, routing and scheduling may be conceptually and functionally separate to facilitate network management. On the other hand, however, the network manager 27 may execute routing and scheduling substantially in parallel to achieve robustness and improve the performance and reliability of the wireless network 14 or 300. More specifically, the network manager 27 may make at least some scheduling decisions in view of the relevant routing constraints and, conversely, make routing decisions in view of the scheduling constraints. In some particularly useful embodiments, the network manager 27 may analyze the topology of the network 14 or 300 first, construct the network graph 67, and then proceed to build a network schedule 67 in view of the network graph 67 and device-specific parameters such as transmission rate, power capability, etc.

When making scheduling decisions in view of a network topology, the network manager 27 may conceptually combine a timeslot in a particular superframe with an edge of a particular direct graph (which is a direct connection 65 in the examples discussed herein) to define a convenient combination space and time unit: a link. In particular, a link may be associated with a direct connection 65 between two communication endpoints as well as with a time during which these two communication endpoints exchange data.

Further, the network manager 27 may associate slots with several types corresponding to different principles of allocating and using the slots. In particular, a dedicated unicast link may be shared by a particular pair of network devices 32-50, so that one of the pair of network devices transmits information to the other one of the pair of network devices with a specified timeslot. Of course, as discussed above with respect to FIG. 3, a network device transmitting certain information during a timeslot may also receive a corresponding acknowledgement from the device receiving this information and in this sense, each of the pair of network devices acts as a transmitter and a receiver in the course of a single timeslot. However, for the sake of simplicity, the device transmitting a block of information in a timeslot is referred to herein as a "talker" and the device receiving this block of information accordingly is referred to as a "listener."

In contrast to a dedicated link, a shared link may have more than one talker but only one listener. In a sense, a shared link is still a unicast link because this link has only one listener. On the other hand, broadcast and multicast links may have one talker and many listeners. Further, a directed links have one talker and a limited set of listeners.

In another aspect, a particular network device may view a dedicated, shared, directed, or broadcast link as a transmit link or as a receive link. Referring back to FIG. 10, for example, the wireless devices 312 and 314 may share a dedicated link associated with some particular timeslot and the direct wireless connection 320, so that the wireless device 312 transmits data via this link and the wireless device 314 receives data via this link. Accordingly, the wireless device 312 may consider this link a transmit link whereas the wireless device 314 may consider the same link a receive link. Thus, classification of links into transmit and receive links is a matter of a device perspective. It will be also noted that some links may be defined and used as transmit/receive links if the devices at either end of a graph edge associated with the link transmit information at some point during the corresponding timeslot.

As indicated above, each link may be associated with a certain timeslot irrespective of a link type. In operation of the wireless network 14 or 300, the network manager 27 or 302A-B may assign links to network devices 30-50, 312, 314, 316, 318, etc. Depending on the link type, the network device associated with the link may transmit a packet, receive a packet, or remain idle. A network device that operates with a transmit link or a transmit/receive link may send a packet within the appropriate segment of the link if the destination of the packet matches the one or more neighbors on the other end of the link. On other hand, a network device that has a receive link, or a transmit/receive link with no packet to send, listens for one or more incoming packets within the timeslot associated with the link. In those embodiments that also use shared links, a device preferably performs a clear channel assessment (CCA) or another method of preventing resource contention before the device begins to transmit via a shared link. In at least some embodiments, all devices that participate in either dedicated or shared links must be awake and listening during the timeslots associated with these dedicated or shared links.

As explained above in reference to FIG. 3, in the course of a single timeslot, one network device may send a data packet and another device may reply with an acknowledgement. Similarly, a communication session via a link may include transmission of a data packet and of an acknowledgement which may be positive ("ACK") or negative ("NACK"). In general, a positive acknowledgement may indicate that the receiver has successfully received the data packet and has assumed ownership of the data packet for further routing if the receiver is not the final destination for this packet. Meanwhile, a negative acknowledgement may indicate that the receiver cannot accept the data packet at this time but has detected the packet with no errors. Further, both ACK's and NACK's may carry timing information so that the corresponding devices may properly maintain network synchronization. In some embodiments, packets sent to a unicast network device address may require a link-layer acknowledgement within the same timeslot while packets sent to a broadcast network device address (e.g., 0xFFFF) may not require an acknowledgement.

When the network manager 27, for example, defines direct connections 65 between network devices 30-50, these network devices receive link assignments. The devices may accordingly define and maintain the respective device schedules 67 (see FIGS. 1 and 4). A link assignment may specify, in part, how the network device should use a certain slot in a superframe. Thus, each link may include exactly one timeslot, type assignment (i.e., transmit and/or receive), neighbor information or other data identifying the edge of a bidirectional or unidirectional graph with which the link is associated, and additional transmit and/or receive attributes.

In some embodiments, the device schedule 67 of each network device 30-50 may maintain additional flags or indicators to properly maintain links of various types. For example, a device schedule 67 may set a shared flag for each shared link so that the corresponding network device 30-50 may properly access this link for transmissions. Further with respect to shared links, the network 14 or 300 may use the well-known slotted Aloha contention management algorithm to define the lifecycle of shared link. Accordingly, the network devices 30-50, 305A-B, 312, 314, 316, 318, etc. may use a collision-avoidance scheme with a backoff in collision situations. In some embodiments, the delay may be implemented as a time measure unrelated to the duration of a single timeslot. In other particularly useful embodiments, the backoff may be implemented as a delay measured in an integer number of timeslots. In particular, a device that has encountered a collision may back off by the duration of a single timeslot, two timeslots, etc. starting at the beginning of the next scheduled timeslot. By synchronizing backoff intervals with timeslots, devices may optimize the retry mechanism and ensure that retry attempts happen only when there is a possibility of transmission. Using shared links may be desirable when bandwidth requirements of devices are low, and/or traffic is irregular or comes in bursts. In some situations, using shared links may decrease latency because the network device does not need to wait for dedicated links, although this generally true only when chances of collisions are relatively low.

Forming Efficient Schedules and Routing Schemes

In addition to optimizing routing by analyzing the network topology, the network manager 27 may define graphs and allocate resources during scheduling also in view of the type of data a particular network device may transmit and, for each type of data, the expected frequency of transmission at each particular device. More specifically, the wireless HART protocol 70 may support several types of network communication traffic. Both the existing HART protocol 72 and the wireless HART protocol 70 support exchanging request/response data, publishing of process data, sending broadcast messages, and block data transfer of large data files. The wireless HART protocol 70 may also support transmission of management data, such as network configuration data, and device communications, such periodic measurements reported by field devices, using the same protocol and the same pool of resources, thus allowing for greater efficiency in scheduling and routing.

The network manager 27 may allocate communication resources to each network device according to the amount of data which the network device may publish per unit of time. For example, the wireless HART flowmeter 30 in the wireless HART network 14 may have an update rate of four seconds while the wireless HART pressure sensor 32 may have an update rate of ten seconds. An operator may configure the network devices 30 and 32 with these values according to the specific needs of the process control system in which the wireless HART network 14 is implemented. As indicated above, multiple superframes may be used to define a different communication schedule for various network devices or groups of network devices. Initially, the network manager 27 may reserve a particular superframe for all network manager requests. Upon accepting network devices such as the flowmeter 30 and the pressure sensor 32, the network manager 27 may allocate additional superframes for the communication rates of four and ten seconds and assign the additional superframes to the network devices 30 and 32. The network manager 27 may also define superframes for alarms and network events prior to or after adding the network devices 30 and 32 to the wireless HART network 14, respectively. The network devices 30 and 32 may, but are not required to, participate in one or more superframes simultaneously. By configuring a certain network device to participate in multiple overlapping superframes of different sizes, it is possible to establish multiple communication schedules and connectivity matrices which may work concurrently without scheduling conflicts. Moreover, because some key applications such as asset management and device specific applications often require considerable bandwidth for short durations of time, the network manager 27 may also create additional temporary superframes as needed. For example, a user may issue a request to view or change the configuration of a device or create a diagnostic screen. The network manager 27 may support this temporary increase in demand for communication slots by defining additional superframes which may stay active for several minutes.

The network manager 27 may consider both the update rates of the network devices and the topology of the wireless HART network 14 when creating directed graphs. However, the network manager 27 may also carry out graph routing decisions separately from scheduling. For example, the network manager may add, delete, or update graphs while keeping the network schedule intact. More specifically, the network schedule may have available timeslots in the defined superframes which the network manager 27 may use as resources when defining new graphs or updating the existing graphs. In this sense, the wireless HART protocol 70 allows graph configuration decisions to proceed separately from scheduling decisions. This feature of the wireless HART protocol 70 can make the wireless HART network 14 more responsive to changes in the environment and in the operational states of the network devices because the wireless HART protocol 70 may quickly and non-intrusively adjust the routing by changing only part of the existing configuration.

Updating Schedules and Routing Schemes

To illustrate some of these automatic scheduling and routing adjustments, FIGS. 13-17 outline several scenarios which may involve a network manager, a gateway, and one or more network devices in a wireless network described above with respect to FIGS. 1-12. For the sake of convenience, each of the UML-style message sequence diagrams of FIGS. 13-17 refers a process timeline associated with the network manager 27 or 302A-B simply as the network manager 400, to a process timeline of a representative network device (e.g., 30-50, 305A-B, 312-318, 342) as a network device 402, to a process timeline of a virtual gateway 24 as the gateway 404, and to a general timeline of one or more intermediate network devices in the corresponding wireless network 14 or 300 as the mesh 406. It will be also noted that the diagrams in FIGS. 13-17 illustrate the message exchange only schematically, and that at least some of the contemplated embodiments may perform similar procedures by sending more or fewer individual messages.

As discussed in detail below, FIG. 13 illustrates a device-initiated request for time resource allocation which a network device 402 may trigger upon detecting one of the predefined conditions. FIG. 14, on the other hand, outlines a procedure of collecting periodic health reports from network device 402B at the network manager 400 and adjusting the network schedule, the routing scheme, or both in response to determining a change in the ability of the network device 402B to transmit and/or receive data. Next, FIG. 15 illustrates a scenario in which a new network device 402B receives an advertisement message from a non-neighbor network device 402, reports the updated neighbor information to the network manager 400 which in turn allocates resources and updates the network schedule and the routing scheme. By contrast, FIG. 16 illustrates an adjustment of the wireless network due to a failure of an existing link between the network devices 402A and 402B. Finally, FIG. 17 illustrates a temporary allocation of resources to enable an external application 410 to obtain a certain amount of unscheduled data from the network device 402. It will be appreciated that each of the scenarios discussed with reference to FIGS. 13-17 may take place on-the-fly, i.e., while the wireless network is operational.

Referring to FIG. 13, the network device 402 may initiate a procedure 420 upon successfully completing a registration with the corresponding wireless network and, optionally, authentication by the network manager 400. Additionally or alternatively, the network device 402 may initiate the procedure 410 in response to detecting a change in the transmission requirements at the network device 402. For example, a technician may locally or remotely reconfigure the update rate of the network device 402 (i.e., the rate at which the network device 402 publishes process data) from 10 seconds to 5 seconds, accordingly resulting in an increase in the required timeslot allocation. Finally, the network device 402 may attempt to negotiate a temporary increase in bandwidth to accommodate a planned block mode transfer session.

As one specific example of a block mode transfer, the network device 402 may complete vibration analysis and wish to report the results to an external application (not shown) residing outside the wireless network. Unlike the scheduled publishing of process control data, the results of vibration analysis may be a relatively large amount of data which the external application may require only occasionally. To transfer this data, the network device 402 and the external application may establish a pipe through the gateway 404 and zero or more intermediate network devices.

With continued reference to FIG. 13, the network device 402 may send a service request 422 to the network manager 400. As used herein, the term "service request" refers generally to requests related to temporary or permanent resource allocation, including requests for additional bandwidth, new graph definition, etc. Of course, if the network device 402 has just joined the wireless network, a service request may refer to a request to accommodate the transmission requirements of the new network node. In this sense, service requests may be used both in resource negotiations and re-negotiations of the already allocated resources. In some embodiments, the service request 422 may specify an amount of data which the network device 402 may need to send per unit of time. In other embodiments, the service request 422 may specify a number of timeslots required to support the new transmission requirement. Further, the service request 422 may specify the acceptable limits of the requested bandwidth which may allow the network manager 400 to partially satisfy the demands of the network device 402. In yet another embodiment, the network device 402 may specify the time in the service request 422 during which the network device 402 may need the requested resources.

The network manager 400 may reply to the service request 422 with a service response 424 to indicate whether the network manager 400 can allocate the requested resources. For example, the network device 402 may be a new node in the wireless network configured to publish the process data once every two seconds. Next, the network manager 400 may determine whether the wireless network currently supports a two-second update superframe and whether the network device 402 may transmit within one of the timeslots of the existing two-second superframe. In some cases, the network manager 400 may define a new two-second update superframe. Further, the network manager 400 may define the appropriate dedicated links and possibly define a new routing graph connecting the network device 402 to the gateway device 404. The network manager 400 may then propagate the relevant portions of these definitions to the network devices which participate in forwarding data packets to and from the network device 402 (message 430 in FIG. 13). The network devices may acknowledge the updates to the respective device schedules and device-specific routing tables (message 432). Finally, the network manager 400 may update the routing and scheduling information at the network device 402 and process the response (messages 434 and 436, respectively).

Now referring to FIG. 14, a procedure 450 may include one or more health reports 452 triggering a re-configuration of at least a portion of the wireless communication scheme (i.e., routing and/or scheduling) at the network manager 400. In particular, the wireless network 14 or 300 may execute several diagnostic procedures to identify potential or actual problems related to excessive failure rates in delivering data packets, unacceptable delays in delivering data packets, or inefficient use of link resources. To this end, the network manager 400 may collect statistics related to the number and size of packets received and transmitted at each network device 402 as well as the percentage of packets delivered successfully. Further, each network device 402 may measure the delay of a particular packet delivery by calculating the number of timeslots elapsed since the transmission of the data packet. Referring back to FIG. 2, each of these network devices may maintain one or more counters associated with the network layer 78 of the protocol operating in the corresponding wireless network. For example, a success rate counter may track a ratio of successfully delivered packets to the number of packets sent for each direct wireless connection 65 (see FIG. 1), a transmit counter may track a number of packets transmitted over a particular direct wireless connection 65, a receive counter may track a number of packets transmitted over a particular direct wireless connection 65, etc. Further, the network device 402B may periodically measure the strength of the signal emitted by a neighbor device such as the network device 402A, for example. As discussed above, the signal level may change because of the environmental conditions or due to a static or moving obstacle.

Referring again to FIG. 14, the health report 452 may include, in part, some or all of the data mentioned above. In some embodiments, the network devices 402 may prepare health reports 452 periodically and propagate these reports toward the gateway 404 which, in turn, may forward each health report 452 to the network manager 400. The network manager 400 may compare the data to a set of predefined or preconfigured threshold values to determine whether the existing paths and schedules are appropriate. In one embodiment, the network manager 400 may evaluate the health reports 452 collected from the entire wireless network to construct a new model of the wireless network in view of the collected information, compare the new model to the current topology and schedule of the wireless network, and optionally update the communication scheme of the wireless network. For example, the network device 402B may report a poor signal quality between the network device 402B and the neighbor network device 402A, as well as a high failure or error rate in packet delivery. On the other hand, the network device 402B may report a better signal received from a network device 402C (not shown) which may not be a neighbor of the network device 402B. In view of this information, the network manager 400 may delete one or more previous routing graphs, de-allocate links using the timeslots in the update superframes of the network device 402B and the direct connection to the network device 402A, and define or more new graphs and allocate new links using the direct connection between network devices 402B and 402C. As illustrated in FIG. 14, the network manager may send network updates 454 and 456 to at least the network devices 402A and 402B.

FIG. 15 illustrates a scenario 470 involving a formation of a new direct connection between the network devices 402A and 402B. In particular, the network device 402A may periodically send out an advertisement message 472 specifying, for example, the timeslots during which a joining device (i.e., a candidate network node) may transmit a join request. In general, the advertisement message 472 may contain sufficient information to allow new neighbors to be discovered or to allow a newly installed device to request admission to the network. In some embodiments, the advertisement message 472 may be associated with the data link layer 76 (see FIG. 2) and may be encapsulated as a Data Link Protocol Data Unit, or a DLPDU. The network device 402B may receive the advertisement message 472 when operating in the listening mode and, upon processing the advertisement information, may propagate a neighbor information report 474 to the network manager 400.

Similar to the scenarios 420 and 450 discussed above, the network manager 400 may process the neighbor information report 474 and optimize the routing and/or scheduling by adding new links, de-allocating some of the existing links, instruct the network devices 402A and 402B to form a new direct wireless connection 65 (see FIG. 1). Upon carrying out the necessary calculations, modeling, and possibly simulation internally, the network manager 400 may propagate the updates 476 and 480 to the network devices 402A and 402B via the mesh 406.

Referring to FIG. 16, a procedure 500 illustrates an automatic update of the network topology and of the portions of the network schedule related to the updated sections of the network upon detecting a failure to publish process data via the primary link at the network device 402A. More specifically, the network device 402A may, at some point in time, successfully publish process data by propagating message 502A to a target device via the network device 402B. At a later time, the network device 402A may fail to transmit a similar message 502B. In particular, the network device 402A may transmit the message 502B but fail to receive an acknowledgement. In some embodiments, the network device 402A may attempt several retransmission attempts prior to trying to verifying the presence of the link by transmitting a keep-alive DPLDU.

In general, every successful communication with a neighbor confirms the presence of the neighbor and thereby serves as an indicator of a quality of the corresponding communication link. However, there may be long intervals during which the neighbors do not transmit data via the shared direct connection 65. For this reason, network devices may probe quiescent links with keep-alive DLPDU messages. In another aspect, keep-alive messages help network devices to discover new neighbors and to maintain time synchronization. In the example scenario illustrated in FIG. 16, the network device 402A may transmit one or more keep-alive messages 504 before determining that the link between the pair of network devices 402A and 402B has failed, at least in the direction toward the network devices 402B.

The network device 402A may then use a secondary path including the network device 402C to publish its process data in a message 502C. As discussed above, the wireless network 14, 140, or 300 may allocate redundant paths and schedules to reduce the probability of not delivering process data to a target device.

Meanwhile, the network device 402B may similarly probe the link operating on the direct wireless connection 65 between the network device 402A and 402B. When the network device 402B does not receive a response to one or more keep-alive messages 506, the network device 402B may send a path down message to the network manager. The network manager 27 may delete the network device 402A from the neighbor list to avoid forwarding other data packets to the network device 402A in the future. Each of the network devices 402A and 402B may forward a path down indication 510 and 512, respectively, to the network manager 400 by using a still-valid path (if one is available).

Now referring to FIG. 17, an external application 410 and several network devices may execute a procedure 540 to allocate resources for a block mode transfer session between the external application 410 and a network device 402. To trigger the procedure 540, an operator may attempt to connect to the network device 402 using the application 410 running on a host external to the wireless network, to take one example. The external application may thus propagate an open port message 542 to the network device 402 via the gateway 404, and the network device 402 may indicate the beginning of the bandwidth allocation sequence by forwarding a processing indication 544.

Next, the network device 402 may send a block mode transfer request 546 to the network manager 400, which may be similarly acknowledged by a processing indication 548. Because the network schedule may not include time resources for block mode transfer during normal operation, the network manager 400 may allocate one or more high-speed superframes, preferably on a temporary basis. In some embodiments, the block mode transfer request 546 may include enough information for the network manager 400 to accurately tailor the one or more high-speed superframes to the requirements of the particular block mode transfer requested in the open port message 542. For example, the network device 402 may specify the amount of data to be transferred and the deadline which the network device 402 must meet to accommodate the external application 410. Based on this information and in view of the available direct wireless connections, channels, regularly scheduled updates, etc., the network manager 400 may calculate the size of the one or more high-speed superframes.

With continued reference to FIG. 17, the network manager 400 may notify the relevant network devices (i.e., devices included in one or more communication paths between the gateway 404 and the network device 402) of the new one or more superframes (message 550). Once the relevant network devices acknowledge the updates of the respective device-specific schedules (message 552), the network manager 400 may notify the network device 402 that the resource are now available (message 560). Finally, the network device 402 may respond to the external application 410 with a port opened message 562 to indicate a successful completion of the bandwidth allocation sequence.

From the foregoing, it will be appreciated that the network manager 402, by working in co-operation with the network devices 402, may perform various diagnostic routines to assess the quality of the wireless network. It will be appreciated that in addition to the procedures discussed above with reference to FIGS. 13-17, the network manager 402, the gateway 404, or the external application 410 may perform further diagnostic routines. For example, in one embodiment, the gateway 404 may probe the wireless network by sending a data packet using source routing. Because source routing, unlike graph routing, may not include a secondary path, the gateway 404 may thereby determine whether any of the direct wireless connections 65 associated with the specified path are down.

As another example, the network manager 402 may monitor changes to power capability at each network node 402. Referring back to FIG. 1, a network device 32 may be battery-powered while the network device 38, which may be a legacy 4-20 mA device or a HART device connected to a wireless adapter 50, may be loop-powered (e.g., by scavenging power from the control loop). Meanwhile, the wireless router 60 may be powered by a power line. In general, the network manager 402 may "favor" loop-powered or power-line powered network devices when defining routing graphs and communication schedule. Moreover, in operation, the network manager 402 may monitor changes to power consumption or power availability at each network device and adjust the scheduling and routing decisions if necessary.

It will be appreciated that some of the methods discussed above need not be restricted to data packets and may be applied to other communication techniques. For example, a network may use a circuit-switched approach and instead of traveling in packets of a finite size, the data may be transmitted as a stream over a dedicated channel between communication endpoints.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method of adaptively scheduling communications in a wireless mesh network including a plurality of network nodes in a process control environment, the method comprising:
   generating, by a centralized network manager, a network routing scheme based on a topology of the wireless mesh network;
   generating, by the centralized network manager, a communication schedule for each node included in the wireless mesh network, including:
      defining a communication timeslot of a predefined duration; and
      defining a plurality of superframes as repeating cycles of different consecutively scheduled numbers of the communication timeslot;
   automatically updating, by the centralized network manager, the communication schedule in response to detecting a changed transmission requirement of one of the plurality of network nodes, wherein the changed transmission requirement is not associated with the one of the plurality of network nodes joining the network, by defining a new superframe as a repeating cycle of a multiplicity of consecutively scheduled communication timeslots, the new superframe made up of a particular consecutively scheduled number of the communication timeslots, the particular consecutively scheduled number being based on the changed transmission requirement of the one of the plurality of network nodes, and updating the communication schedule using the new superframe to perform communications to or from the one of the plurality of network nodes, wherein the changed transmission requirement corresponds to a change in an update rate of a particular node included in the plurality of network nodes, the update rate corresponding to a rate of publishing of process control data generated by the particular network node and corresponding to a process control function in the process control environment.

2. The method of claim 1, wherein detecting the changed transmission requirement of at least one of the plurality of network nodes includes detecting at least one of addition of a new network node to the plurality of network nodes or a removal of one of the plurality of network nodes from the wireless mesh network.

3. The method of claim 1, wherein generating a network routing scheme based on a topology of the wireless mesh network includes:
defining a plurality of direct wireless connections between pairs of the plurality of network nodes based on at least one of a strength, a minimum number of hops between a source network node and a destination network node, or a quality of a respective wireless signal; and
creating a plurality of directed graphs, each graph connecting a source node and destination node and including one or more of the plurality of direct wireless connections.

4. The method of claim 3, wherein at least some of the plurality of network nodes are wireless field devices operating in a process control environment; and wherein creating a plurality of directed graphs includes associating one of the source node or the destination node of each of the plurality of directed graphs with a gateway connecting the wireless mesh network to a plant automation network.

5. The method of claim 3, wherein creating a plurality of directed graphs includes, for each of the plurality of directed graphs, creating a redundant graph between the source node and the destination node having at least one direct wireless connection distinct from each of the direct wireless connections associated with the directed graph; and wherein detecting the changed transmission requirement of the one of the plurality of network nodes further includes:
detecting a failure to communicate with the one of the plurality of network nodes associated with a directed graph; and
routing a message indicative of the failure using a redundant graph corresponding to the directed graph.

6. The method of claim 1, wherein automatically updating the communication schedule includes:
periodically exchanging keep-alive messages between pairs of the plurality of network nodes sharing a direct wireless connection;
propagating a path down indication indicative of a failure of a certain direct wireless connection to a network manager responsible for updating the network routing scheme and the communication schedule in the wireless mesh network; and
removing the certain direct wireless connection from the network routing scheme.

7. The method of claim 1, wherein defining a plurality of superframes includes defining lengths of at least some of the plurality of superframes based on update rates of at least some of the network nodes.

8. The method of claim 7, wherein automatically updating the communication schedule includes:
detecting a temporary increase in a bandwidth requirement at the one of the plurality of network nodes; and
creating the new superframe for transferring traffic associated with the temporary increase in the bandwidth requirement.

9. A method of adaptively scheduling communications in a wireless mesh network including a plurality of network nodes, wherein at least some of the plurality of network nodes are field devices operating in a process control environment; the method comprising:
generating, by a centralized network manager, a communication schedule for each network node of the plurality of network nodes included in the wireless mesh network, including:
defining a communication timeslot of a predefined duration;
defining a plurality of superframes as repeating cycles of different consecutively scheduled numbers of the communication timeslot; and
associating each of the field devices with at least one of the plurality of superframes, including selecting the at least one of the plurality of superframes based on a rate of scheduled publishing of process data generated by the field device and corresponding to a process control function in the process control environment;
automatically updating, by the centralized network manager, the communication schedule in response to detecting a change in performance of the wireless mesh network without restarting the wireless mesh network.

10. The method of claim 9, further comprising monitoring the performance of the wireless mesh network by collecting statistical data related to a transfer of data packets between pairs of network nodes along one or more direct wireless connections, each connecting two of the plurality of network nodes.

11. The method of claim 10, wherein collecting statistical data includes at least one of counting a number of packets successfully delivered between at least one pair of the plurality of network nodes, counting a number of packets received at each of the plurality of network nodes, counting a number of packets transmitted at each of the plurality of network nodes, and calculating a delay associated with a delivery of a data packet between at least one pair of the plurality of network nodes.

12. The method of claim 10, wherein the method further comprises creating, by the centralized network manager, a routing scheme for the wireless mesh network, including:
defining a plurality of directed graphs between the field devices and a gateway device connecting the wireless mesh network to an external network; and
wherein collecting statistical data related to a transfer of data packets between pairs of network nodes includes separately maintaining separate statistics for each of the plurality of directed graphs.

13. The method of claim 10, wherein detecting a change in performance of the wireless network includes:

collecting health reports from at least some of the plurality of network nodes, wherein each health report from a network node includes data related to direct wireless connections between the network node and other ones of the plurality of network nodes; and determining a change in the direct wireless connections available at the network node relative to a previous health report.

14. The method of claim 9, wherein the method further comprises creating, by the centralized network manager, a routing scheme for the wireless mesh network, including:

defining a plurality of directed graphs between the field devices and a plurality of network access points associated with a gateway device connecting the wireless mesh network to an external network; wherein each of the plurality of directed graphs is associated with at least one respective communication timeslot in at least one respective superframe included in the plurality of superframes, and wherein each of the plurality of directed graphs independently supports a communication path to the gateway device.

15. The method of claim 9, wherein detecting a change in performance of the wireless mesh network includes receiving a message from one of the plurality of network nodes requesting a change in bandwidth allocation.

16. A method of optimizing a transfer of data in a wireless communication network operating in a process control environment and including a plurality of wireless network devices, the method comprising:

generating, by a centralized network manager, a routing scheme including a plurality of directed routing graphs, each graph connecting two of the plurality of wireless network devices and having a source node and a destination node, including:
defining a plurality of direct wireless connections between pairs of the plurality of wireless network devices; and
associating each of the plurality of directed routing graphs with one or more direct wireless connections;
generating, by the centralized network manager, a communication schedule for the wireless mesh network, including:
defining a communication timeslot of a predefined duration;
defining a plurality of superframes as repeating cycles different consecutively scheduled numbers of the communication timeslot; and
associating each device of the plurality of wireless network devices with at least one of the plurality of superframes, including selecting the at least one of the plurality of superframes based on rate of scheduled publishing of process data generated by the each device and corresponding to a process control function in the process control environment; and
optimizing, by the centralized network manager, the routing scheme and the communication schedule during an operation of the wireless network by monitoring at least a health of each of the plurality of direct wireless connections.

17. The method of claim 16, wherein monitoring the health of each of the plurality of direct wireless connections includes:

receiving a health report from at least one of two wireless network devices associated with the direct wireless connection; and
undefining the direct wireless connection if the health report indicates a low signal level.

18. The method of claim 16, wherein optimizing the routing scheme and the communication schedule during an operation of the wireless network includes routing less data through battery-powered wireless network devices than through wireless network devices having access to a constant power source.

19. The method of claim 16, further comprising allocating, by the centralized network manager, additional bandwidth in response to receiving a request from one of the plurality of wireless network devices.

20. The method of claim 16, further comprising allocating, by the centralized network manager, additional bandwidth in response to receiving a request from a gateway connecting the wireless communication network to a plant automation network; wherein the gateway requests additional bandwidth to set up a data pipe between an external application and one of the plurality of wireless network devices.

21. The method of claim 20, wherein allocating additional bandwidth includes creating a temporary superframe for use by the one of the plurality of wireless network devices, wherein the temporary superframe has a shorter length than a superframe corresponding to the rate of scheduled publishing of process data at the one of the plurality of wireless network devices.

22. A method of adaptively scheduling communications in a wireless mesh network including a plurality of network nodes in a process control environment, the method comprising:

generating, by a centralized network manager, a network routing scheme based on a topology of the wireless mesh network;
generating, by the centralized network manager, a communication schedule for the wireless mesh network, including:
defining a communication timeslot of a predefined duration; and
defining a plurality of superframes as repeating cycles of different consecutively scheduled numbers of the communication timeslot;
deactivating, by the centralized network manager, one of the plurality of superframes in response to a network condition, wherein the one of the plurality of superframes remains associated with the communication schedule while deactivated, and wherein none of the plurality of network nodes transmits or receives data in the one of the plurality of superframes while the one of the plurality of superframes is deactivated.

23. The method of claim 22, further comprising reactivating, by the centralized network manager, the one of the plurality of superframes in response to a second network condition, wherein reactivating the one of the plurality of superframes includes allowing at least one of the plurality of network nodes to transmit or receives data within at least one timeslot associated with the one of the plurality of superframes.

24. The method of claim 22, wherein the network condition is associated with a desired throughput of the wireless mesh network.

* * * * *